United States Patent
Sun et al.

(10) Patent No.: US 10,957,103 B2
(45) Date of Patent: Mar. 23, 2021

(54) DYNAMIC MAPPING OF VIRTUAL AND PHYSICAL INTERACTIONS

(71) Applicant: ADOBE INC., San Jose, CA (US)

(72) Inventors: Qi Sun, Centereach, NY (US); Paul John Asente, Redwood City, CA (US); Li-Yi Wei, Redwood City, CA (US); Jingwan Lu, Santa Clara, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/934,000

(22) Filed: Mar. 23, 2018

(65) Prior Publication Data
US 2019/0139308 A1    May 9, 2019

Related U.S. Application Data

(60) Provisional application No. 62/581,604, filed on Nov. 3, 2017.

(51) Int. Cl.
*G06T 15/40* (2011.01)
*G06T 19/00* (2011.01)
*G06K 9/00* (2006.01)
*G06T 15/10* (2011.01)

(52) U.S. Cl.
CPC ........ *G06T 19/006* (2013.01); *G06K 9/00671* (2013.01); *G06T 15/10* (2013.01); *G06T 2200/04* (2013.01)

(58) Field of Classification Search
CPC ... G06T 19/006; G06T 15/10; G06T 2200/04; G06K 9/00671
See application file for complete search history.

(56) References Cited

U.S. PATENT DOCUMENTS

| | | | | |
|---|---|---|---|---|
| 10,319,266 | B1 * | 6/2019 | Percival | G09F 9/33 |
| 10,403,043 | B2 * | 9/2019 | Kaufman | G09B 9/30 |
| 2006/0167630 | A1 * | 7/2006 | Noma | G06F 17/5095 701/117 |
| 2013/0335302 | A1 * | 12/2013 | Crane | H04N 5/2354 345/8 |
| 2014/0002493 | A1 * | 1/2014 | Mitchell | G06T 13/20 345/633 |
| 2014/0104316 | A1 * | 4/2014 | Sharma | G06F 1/1626 345/633 |

(Continued)

OTHER PUBLICATIONS

Sun, Q., Wei, L. Y., & Kaufman, A. (2016). Mapping virtual and physical reality. ACM Transactions on Graphics (TOG), 35(4), 64.

(Continued)

*Primary Examiner* — Samantha (Yuehan) Wang
(74) *Attorney, Agent, or Firm* — F. Chau & Associates, LLC

(57) ABSTRACT

Methods and systems are provided for performing dynamic mapping between a virtual environment and a real-world space. During dynamic mapping, a current virtual scene of the virtual environment that is within view of a user is prioritized over areas of the virtual environment that are out of view. The dynamic mapping between the virtual environment and the real-world space can be utilized to render a virtual scene for user in real-time. As a user interacts and/or moves within the virtual environment, dynamic mapping can be performed in real-time to capture any dynamic changes to the real-world space and/or the virtual environment.

16 Claims, 16 Drawing Sheets

(56) References Cited

U.S. PATENT DOCUMENTS

2016/0217623 A1* 7/2016 Singh .................. G09G 3/003
2018/0204380 A1* 7/2018 Kumar ................ G06T 19/003
2018/0253144 A1* 9/2018 Alleaume .......... G06F 3/04842
2019/0051051 A1* 2/2019 Kaufman .............. G01C 21/32

OTHER PUBLICATIONS

Dong, Z. C., Fu, X. M., Zhang, C., Wu, K., & Liu, L. (2017). Smooth assembled mappings for large-scale real walking. ACM Transactions on Graphics (TOG), 36(6), 211.

Gal, R., Shapira, L., Ofek, E., & Kohli, P. (Sep. 2014). FLARE: Fast layout for augmented reality applications. In Mixed and Augmented Reality (ISMAR), 2014 IEEE International Symposium on (pp. 207-212). IEEE.

Azmandian, M., Hancock, M., Benko, H., Ofek, E., & Wilson, A. D. (May 2016). Haptic retargeting: Dynamic repurposing of passive haptics for enhanced virtual reality experiences. In Proceedings of the 2016 chi conference on human factors in computing systems (pp. 1968-1979). ACM.

Cheng, L. P., Ofek, E., Holz, C., Benko, H., & Wilson, A. D. (May 2017). Sparse Haptic Proxy: Touch Feedback in Virtual Environments Using a General Passive Prop. In Proceedings of the 2017 CHI Conference on Human Factors in Computing Systems (pp. 3718-3728). ACM.

* cited by examiner

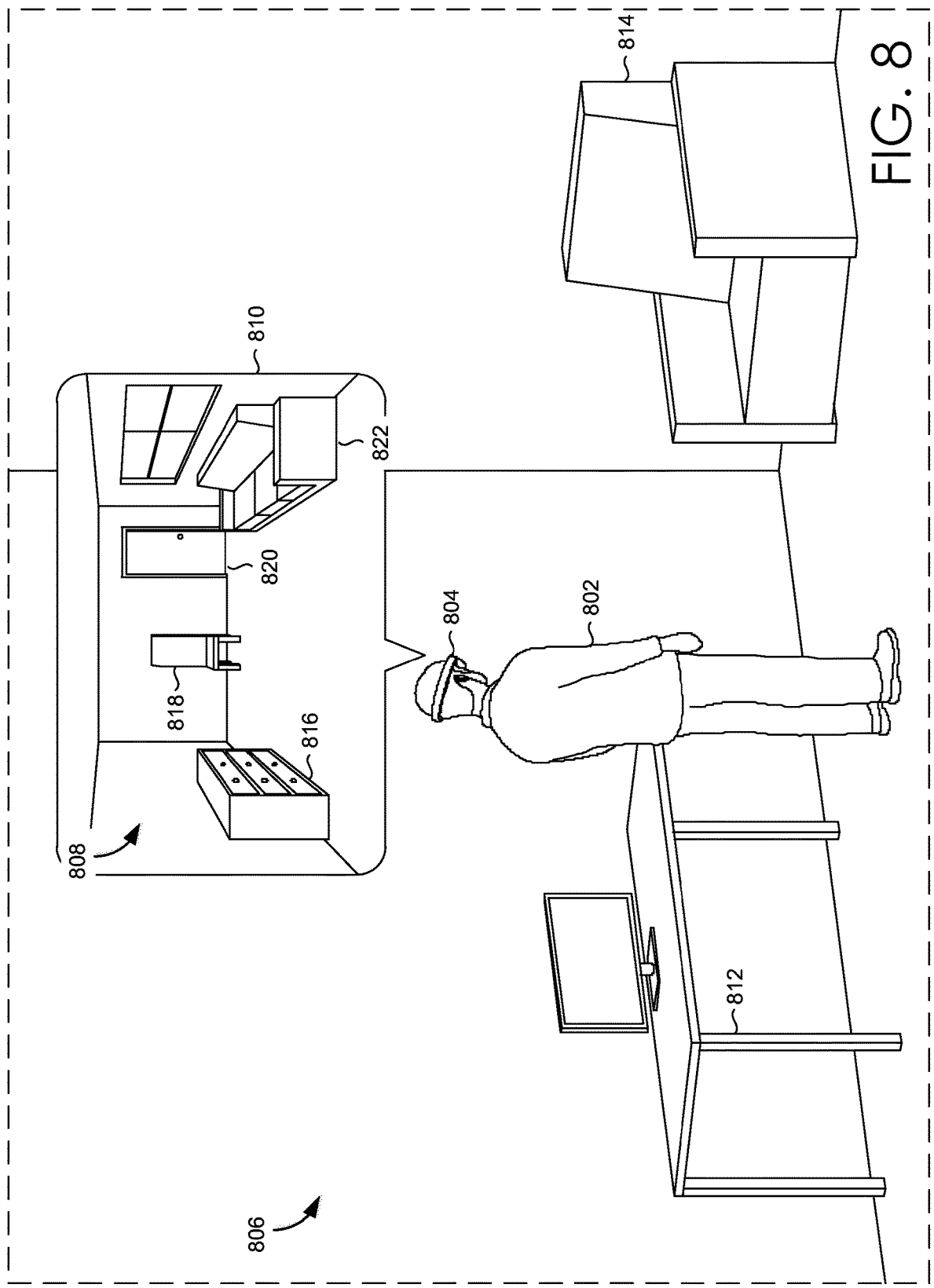

DYNAMIC MAPPING OF VIRTUAL AND PHYSICAL INTERACTIONS

CROSS REFERENCE TO RELATED APPLICATIONS

This application claims the benefit of U.S. Provisional Application No. 62/581,604, filed Nov. 3, 2017, entitled "Dynamic Mapping of Virtual and Physical Interactions," the benefit of priority of which is hereby claimed, and which is incorporated by reference herein in its entirety.

BACKGROUND

Compelling virtual-based experiences often depend on consistency between virtual and real-world perceptions (e.g., visual, tactile, haptic, audio, etc.). Such virtual-based experiences often utilize virtual environments generated using virtual reality (VR), augmented realty (AR), or mixed reality (MR). Aligning real-world perceptions with the virtual environment can add an immersive quality to the virtual-based experience while inconsistencies can lead to jarring distractions.

One approach for increasing realism utilizes redirected walking. Redirected walking allows users to move their physical bodies in a real-world space while perceiving a virtual environment. In addition to increasing realism, redirected walking can additionally or alternatively be used to reduce simulator sickness, a side effect that may occur when a virtual view differs from real-word vestibular perceptions. For example, a user may incur simulator sickness when a user experiences visual cues of moving in the virtual world, but the user's real-world body remains static.

Generally, when utilizing redirected walking to manipulate a user's movement within a real-world environment, the user can be guided away from physical obstacles, such as walls and furniture, so that the user does not collide with the real-world objects as the user walks around. In one conventional approach, a real-world floor plan can be mapped to a virtual floor plan to perform redirected walking. Such an approach, however, is based on a static two-dimensional floor map that does not account for moving real-world objects in the environment and, thus, is not adaptive to changes in the environment. In this regard, movement of a real-world object (e.g., a physical desk) in a real-world environment might result in a user colliding into the moved real-world object.

Further, such a conventional approach does not allow for interaction with real-world, three-dimensional objects. Instead, redirected walking treats real-world objects as obstacles to be avoided, guiding users away from real-world objects, such as walls and furniture. In some cases, however, it may be desirable to interact with a real-world object. For example, when a user interacts with a virtual object, realism of a virtual experience is increased when the user's body also physically perceives an interaction with a real-world object. Although some conventional approaches are directed to enabling tactile interaction, such approaches are limited to confined user interaction with a small object in a single virtual scene.

SUMMARY

Embodiments of the present disclosure are directed towards a system for dynamically mapping a virtual environment to a real-world space. Dynamic mapping can align virtual pixels from a virtual environment to points in the real-world. During dynamic mapping, virtual pixels from a user's current viewing scene can be prioritized over virtual pixels outside of the current viewing scene. Mapping of a virtual environment to a real-world space in this manner enables redirected walking of the user in the real-world while viewing the virtual environment. The virtual environment presented to a user utilizing dynamic mapping allows for the virtual environment to be realistically, or accurately reflective, of the position and/or movement of real-world objects, and importantly, large-scale objects (e.g., a desk, chair, bed, etc.).

The virtual environment presented to the user can utilize dynamic mapping during rendering to generate a current viewing scene of the virtual environment in a manner utilizing haptic feedback to increase realism. Haptic feedback can be provided to a user in the virtual environment by aligning virtual objects and real-world objects with similar properties as a user moves throughout the virtual environment. In this way, dynamic mapping can be applied during the rendering process to virtual objects that can be visually warped without distracting a user's perception of the virtual object (e.g., walls). In a second pass of rendering, objects that can cause visual disruption when warped can be added back into the rendered virtual scene by matching the virtual objects with corresponding real-world objects (e.g. rigid objects such as a chair or bed). In this regard, real-world objects, particularly large-scale real-world objects, are not treated as obstacles to be avoided during redirected walking, but instead can be aligned with virtual objects when such alignment can increase the realism of the virtual experience (e.g., aligning a real-world chair with a virtual chair, allowing the user to sit down in the real world as well as in the virtual-based experience). Accordingly, a dynamic mapping system can support redirected interaction(s) with large-scale objects along with redirected walking to provide a user with a fully immersive virtual experience.

Such dynamic maps can be generated in real-time allowing real-world objects to be interacted with in the real-world space while updating a corresponding virtual object. That is, as a user moves in a real-world space, the virtual environment presented to the user can be updated in real-time, or near real-time, to reflect various aspects of the real-world space, such as small and large objects in the space.

BRIEF DESCRIPTION OF THE DRAWINGS

FIG. 8 depicts an illustrative dynamic mapping between a virtual environment and a real-world space, in accordance with embodiments of the present disclosure.

DETAILED DESCRIPTION

Figure 1A:
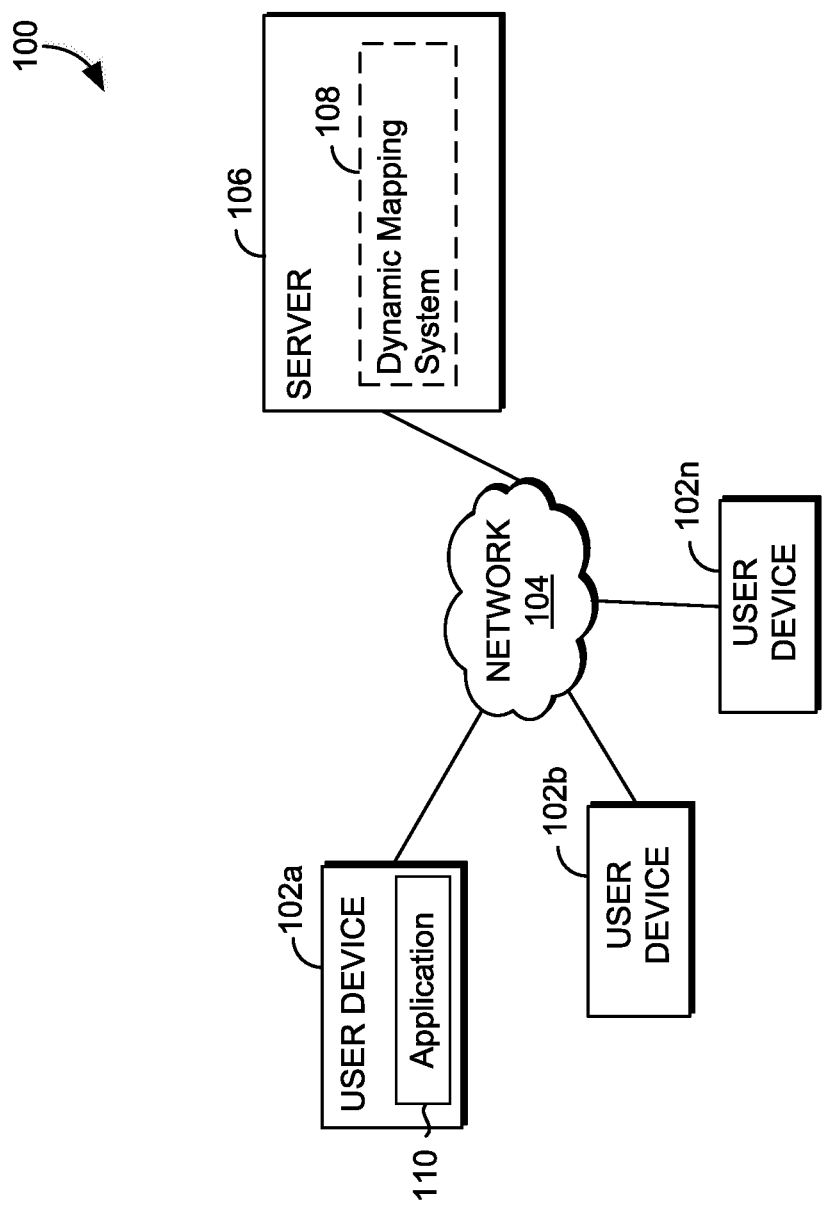
FIG. 1A depicts an example configuration of an operating environment in which some implementations of the present disclosure can be employed, in accordance with various embodiments of the present disclosure.

Oftentimes, users desire virtual environments to be consistent with perceptual sensory cues (e.g., visual, tactile, vestibular, etc.). Such virtual environments can be experienced using VR, AR, or MR. Aligning perceptual sensory cues can add an immersive quality to virtual-based experiences, while inconsistencies can lead to jarring distractions for a user.

One method used for aligning perceptual sensory cues to increase realism is redirected walking. With redirected walking, a user generally moves the user's physical body to bridge visual cues being perceived in the visual environment with vestibular cues. For instance, if a user is walking through a garden in a virtual environment, redirected walking enables the user to walk in the real-world in a manner aligned with the virtual experience. During redirected walking, conventional methods currently guide a user away from real-world objects, such as walls and/or other objects. Such methods for redirected walking treat objects as obstacles to be avoided, rather than interacted with. Further, as the process of generating a map between a virtual environment and a real-world space is a highly computational and time-consuming process, it is difficult to generate maps in real-time. As such, conventional methods cannot handle dynamic changes made to the real-world environment.

Another method used for aligning perceptual sensory cues to increase realism is haptic targeting or haptic retargeting (generally referred to herein as haptic targeting). Generally, haptic targeting refers to a user feeling a physical presence when interacting with a virtual object. Haptic retargeting relies on the dominance of visual cues when senses conflict. The focus of haptic retargeting is that real-world physical objects can be reused to provide haptic feedback for multiple virtual objects. For instance, a user can sit at a desk with a single real-world water glass in front of them, however, in a virtual environment, the user can view two water glasses on the desk. Haptic retargeting can manipulate the user's visual perception to guide interactions with the real-world water glass in such a way that the user will believe there are actually two real-world water glasses on the desk. Conventional methods that employ haptic targeting, however, enable tactile feedback interactions with small, individual objects. To this end, a user cannot move around an environment and interact with objects, including small and large objects.

Accordingly, embodiments of the present disclosure are directed to facilitating dynamic mapping of a virtual environment to real-world space. In this regard, instead of treating large-scale real-world objects as obstacles to be avoided, such real-world objects can be aligned with virtual objects when such alignment can increase the realism of the virtual-based experience. A dynamic map can be generated in real-time allowing, for example, large-scale real-world objects to be interacted with in the real-world while updating a corresponding virtual object. For instance, if the real-world object is a chair, a user can move the real-world chair and a corresponding virtual chair can be shown to move as well. By using dynamic mapping, a user can accurately move around in a virtual environment as well as interact with objects in the virtual environment. That is, a user can interact with virtual objects via their physical counterparts, including small-scale objects and large-scale objects, while perceiving a virtual environment through VR, AR, or MR devices and freely walking in a real-world environment.

Generally, dynamic mapping refers to generating a map that associates a virtual environment to a real-world space in real-time, or near real-time. As described, a map (also referred to herein as a dynamic map) associating a virtual environment to a real-world space that is generated in real-time enables the virtual environment to accurately reflect large-scale objects in the real-world such that redirected walking can occur around actual positions of objects and, further, enables interaction with such objects. In this regard, dynamic mapping refers to a real-time mapping computation as opposed to a pre-computed mapping method, as in conventional methods. That is, instead of a static mapping between a particular virtual environment and real-world space, dynamic mapping is used to adapt to run-time user movements as well as changes in the virtual environment and/or real-world space. Utilization of such dynamic mapping reduces distortion and provides a more convincing or pleasing immersion for both visual and tactile perceptions.

As such, embodiments of the present disclosure describe various aspects of generating and using a dynamic map to render a virtual environment that accurately reflects objects in the real-world. In particular, to efficiently generate a dynamic map in real-time, the dynamic mapping system generally described herein prioritizes a virtual scene of the virtual environment within a user's view over spaces of the virtual environment out of view due to occlusion (e.g., by depth) and/or clipping (e.g., by camera frustum). Such prioritization can occur by taking more samples from the virtual scene within the user's view than the samples taken from the out-of-view virtual environment. In this way, virtual camera-aware sampling (e.g., sampling prioritizing the user's virtual view of the scene based on the scene detected by the virtual camera) can take place such that when sampling occurs for a virtual environment, a denser set of virtual pixel samples is taken for visible content and a sparser set of virtual pixel samples for content not in view of the user. Advantageously, prioritizing the user's virtual scene view over the spaces of the virtual environment outside of the user's view allows for an efficient generation of dynamic maps thereby increasing computational efficiency and enabling dynamic mapping to be performed in real-time. By prioritizing the user's virtual scene view, the user's virtual-based experience can be maintained while warping the virtual environment outside of the user's view.

Upon generating dynamic maps, the dynamic maps can be used to render the virtual environment that accurately reflects various objects in the real-world space. As described herein, a multi-pass method that can render groups of objects under different camera settings can be employed. Such a multi-tiered method can provide better control for quality as well as potential disocclusion artifacts.

Turning to FIG. 1A, FIG. 1A depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1A is an example of one suitable operating environment. Among other components not shown, operating environment 100 includes a number of user devices, such as user devices 102a and 102b through 102n, network 104, and server(s) 106. Each of the components shown in FIG. 1A may be implemented via any type of computing device, such as one or more of computing device 1000 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. The network 104 may be any network that enables communication among machines, databases, and devices (mobile or otherwise). Accordingly, the network 104 may be a wired network, a wireless network (e.g., a mobile or cellular network), a storage area network (SAN), or any suitable combination thereof. In an example embodiment, the network 104 includes one or more portions of a private network, a public network (e.g., the Internet), or combination thereof. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, a virtual reality hardware platform, augmented reality hardware platform, mixed-reality hardware platform, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 in carrying out dynamic mapping between a virtual environment and a real-world space. In some implementations, the application(s) comprises a web application, which can run in a web browser, and could be hosted at least partially on the server-side of environment 100. In addition, or instead, the application(s) can comprise a dedicated application, such as an application having dynamic mapping and/or virtual visualization functionality. For example, such an application can be configured to perform dynamic mapping. Such an application can also be capable of displaying a rendered virtual environment utilizing dynamic mapping. In some cases, the application is integrated into the operating system (e.g., as a service). It is therefore contemplated herein that "application" be interpreted broadly.

The user device can communicate over a network 104 with a server 106 (e.g., a Software as a Service (SAAS) server), which provides a cloud-based and/or network-based dynamic mapping system 108. The dynamic mapping system of server 106 may communicate with one or more user devices and corresponding user interface(s) to facilitate dynamic mapping of a virtual environment with a real-world space via the user device using, for example, application 110. The dynamic mapping system 108 may further communicate with the user devices to facilitate visualization of a rendered virtual scene utilizing a dynamic map of the virtual environment with the real-world space.

As described herein, server 106 can facilitate dynamic mapping of virtual environments with a real-world space via dynamic mapping system 108. Server 106 includes one or more processors, and one or more computer-readable media. The computer-readable media includes computer-readable instructions executable by the one or more processors. The instructions may optionally implement one or more components of dynamic mapping system 108, described in additional detail below.

Application 110 may be utilized by a user to interface with the functionality implemented on server(s) 106, such as dynamic mapping system 108. In some cases, application 110 comprises a web browser. Application 110 can also comprise an application on a head-mounted display for experiencing VR, AR, and/or MR. In other cases, server 106 may not be required, as further discussed with reference to FIG. 1B.

Thus, it should be appreciated that dynamic mapping system 108 may be provided via multiple devices arranged in a distributed environment that collectively provide the functionality described herein. Additionally, other components not shown may also be included within the distributed environment. In addition, or instead, dynamic mapping system 108 can be integrated, at least partially, into a user device, such as user device 102a.

Figure 1B:
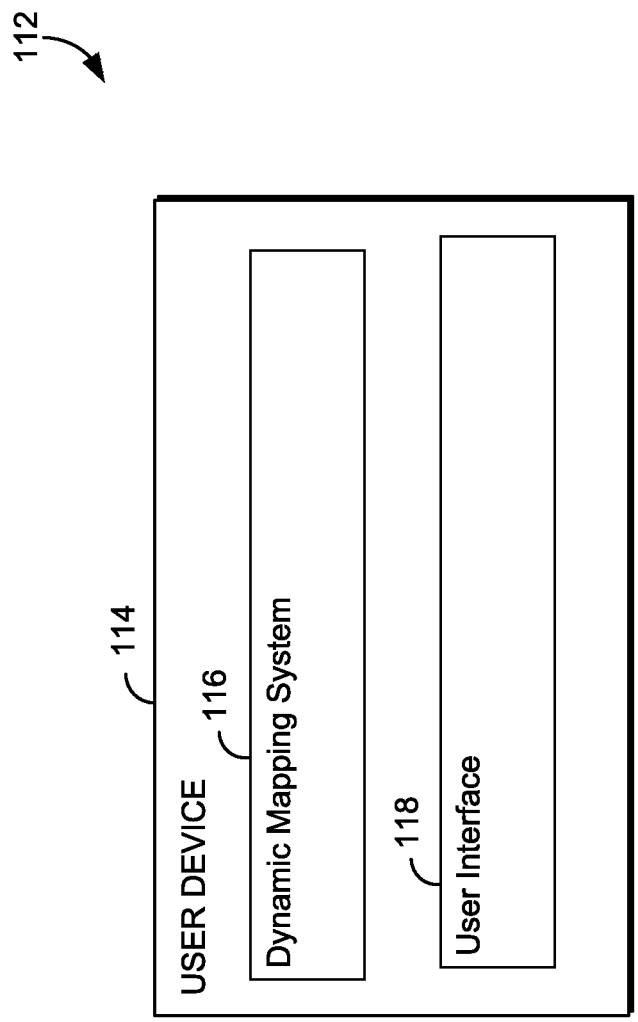
FIG. 1B depicts an example configuration of an operating environment in which some implementations of the present disclosure can be employed, in accordance with various embodiments of the present disclosure.

Referring to FIG. 1B, aspects of an illustrative dynamic mapping system are shown, in accordance with various embodiments of the present disclosure. FIG. 1B depicts a user device 114, in accordance with an example embodiment, configured to allow for dynamic mapping system. The user device 114 may be the same or similar to the user device 102a-102n and may be configured to support the dynamic mapping system 116 (as a standalone or networked device). For example, the user device 114 may store and execute software/instructions to facilitate interactions between a user and the dynamic mapping system 116 via the user interface 118 of the user device.

A user device can be utilized by a user to facilitate dynamic mapping between a virtual environment and a real-world space. In particular, a user can select a virtual-based experience for visualization utilizing user interface 118. A virtual experience can be selected or input in any manner. The user interface may facilitate the user accessing one or more stored virtual-based experiences on the user device (e.g., in games library), and/or import virtual-based experiences from remote devices and/or applications. The user interface may also facilitate the type of visual-based experience (e.g., VR, AR, or MR). Based on the selected virtual-based experience, dynamic mapping between the virtual environment and/or virtual scenes of the virtual environment of the selected virtual-based experience and a real-world space can be performed using various techniques, some of which are further discussed below with reference to dynamic mapping system 204 of FIG. 2. User device 114 can also be utilized for displaying a rendered visualization of a virtual environment and/or virtual scene(s) of the virtual environment utilizing a dynamic mapping between the virtual environment and a real-world space using various techniques, some of which are further discussed below with reference to dynamic mapping system 204 of FIG. 2.

Figure 2:
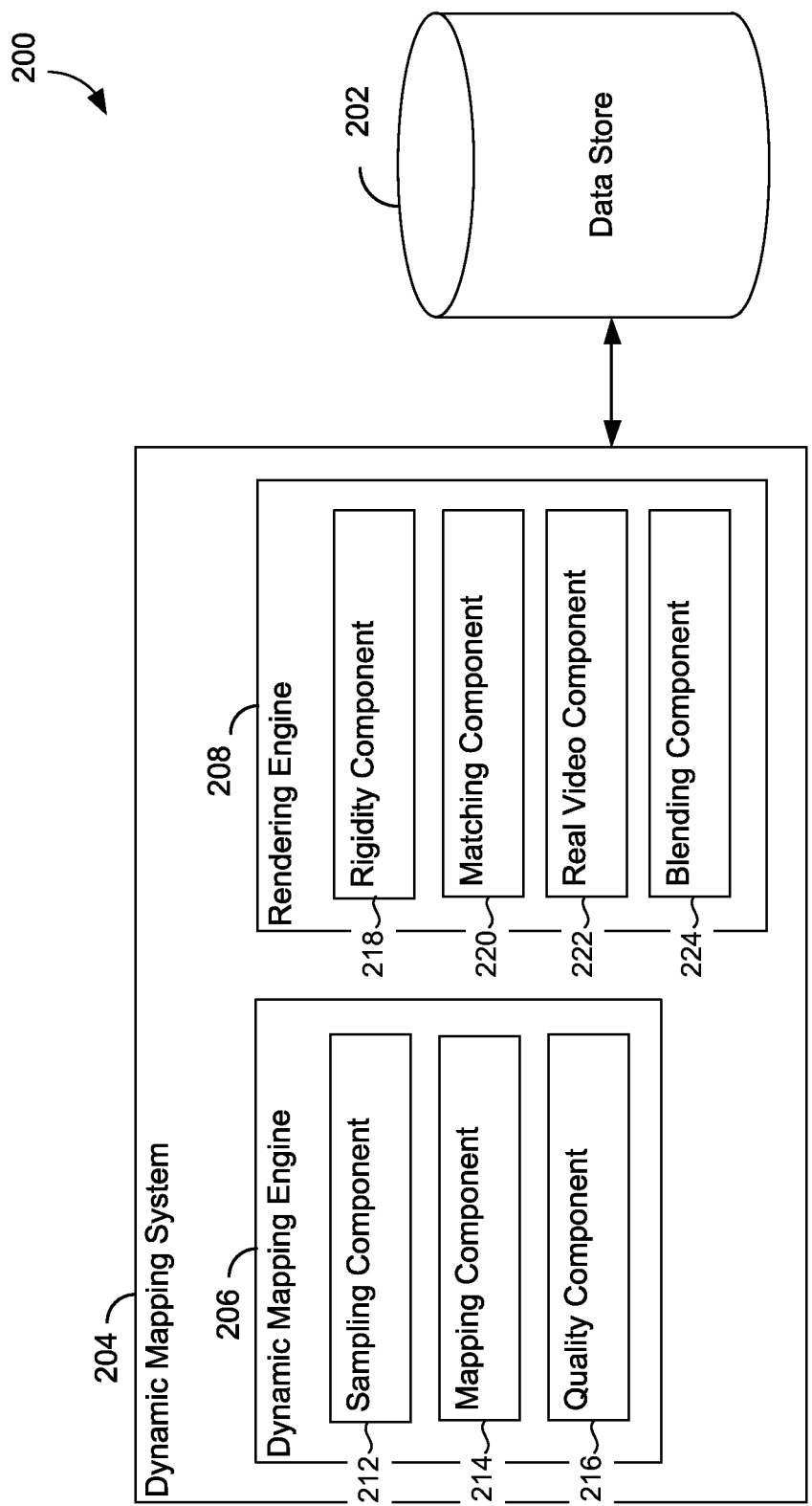
FIG. 2 depicts aspects of an illustrative dynamic mapping system, in accordance with various embodiments of the present disclosure.

Referring to FIG. 2, aspects of an illustrative dynamic mapping environment 200 are shown, in accordance with various embodiments of the present disclosure. Dynamic mapping system 204 includes dynamic mapping engine 206 and rendering engine 210. The foregoing engines of dynamic mapping system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the dynamic mapping engine and rendering engine are depicted as separate engines, it should be appreciated that a single engine can perform the functionality of both engines. Additionally, in implementations, the functionality of the engines can be performed using additional engines and/or components. Further, it should be appreciated that the functionality of the engines can be provided by a system separate from the dynamic mapping system.

As shown, a dynamic mapping system can operate in conjunction with data store 202. Data store 202 can store computer instructions (e.g., software program instructions, routines, or services), data, and/or models used in embodiments described herein. In some implementations, data store 202 can store information or data received via the various engines and/or components of dynamic mapping system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 can include virtual environments a user can explore during a virtual-based experience. Such virtual environments can be input into data store 202 from a remote device, such as from a server or a user device. Data stored in data store 202 can also include virtual scenes from such virtual environments. Such virtual scenes include virtual scene objects and associated properties (e.g., dimensions of the virtual scene objects). Data stored in data store 202 can further include other attributes or information associated with dynamic mapping.

Dynamic mapping system 204 can generally be used for dynamic mapping between a virtual environment and a real-world space. Specifically, the dynamic mapping system can be configured for mapping virtual environment pixels to points in a real-world space. In accordance with embodiments described herein, surjective mapping can be utilized, which allows for warping large virtual floor plans into small real-world physical spaces. As used herein, dynamic mapping generally includes mapping a virtual environment (e.g., floor plan) including virtual objects to a real-world space that can include real-world objects. Such a dynamic map can be used to allow for redirected interaction as well redirected walking. Surjective dynamic mapping allows for redirected walking and interacting with multiple virtual objects, importantly, large-scale real-world objects, aligned with at least one real-world object using redirected interaction. In this way, dynamic mapping allows for warping a virtual environment to fit a real-world space and aligning real-world objects with virtual objects to increase haptic feedback. Such dynamic mapping also allows multiple users to interact in the same virtual/real-world space in a manner where each user's position and interactions with real-world objects can be updated in other user's virtual environment view.

A virtual environment can be accessed or referenced by dynamic mapping engine 206 for dynamically mapping with a real-world space. In this regard, the dynamic mapping engine 206 may access or retrieve a virtual environment, including a virtual scene currently being viewed by a user, via a user device. As another example, the dynamic mapping engine 206 may receive a virtual environment from data store 202 and/or from a remote device, such as from a server or a user device. Dynamic mapping between a virtual environment and a real-world space can be initiated in any number of ways. For example, dynamic mapping can take place automatically in real-time when a user changes views in the virtual environment. As another example, dynamic mapping can take place automatically in real-time when any change is made in the real-world space.

As shown, dynamic mapping engine 206 can include sampling component 212, mapping component 214, and quality component 216. The foregoing components of the dynamic mapping engine can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. It should be appreciated that while sampling component, mapping component, and quality component are depicted as a separate components, in implementations, the functionality of these components can be performed using a single components and/or additional components.

Sampling component 212 can be utilized to sample the virtual environment for use in performing dynamic mapping. Generally, sampling the virtual environment refers to selecting pixels in the virtual environment to map to real-world points during dynamic mapping. In dynamic mapping, a virtual scene of the virtual environment within a user's view is prioritized over spaces of the virtual environment out of view due to occlusion (e.g., by depth) and/or clipping (e.g., by camera frustum). Such prioritization can occur by taking more samples from the virtual scene within the user's view than the samples taken from the out of view virtual environment. Advantageously, by prioritizing the user's virtual scene view over the spaces of the virtual environment outside of the user's view allows for more arbitrary warping of the virtual environment outside of the user's view without negatively impacting the user's virtual-based experience. A further advantage of such prioritization is the increase in computational efficiency allowing dynamic mapping to be performed in real-time. In this way, virtual camera-aware sampling (e.g., sampling prioritizing the user's virtual view of the scene based on the scene detected by the virtual camera) can take place such that when sampling occurs for a virtual environment, a denser set of virtual pixel samples $S_f$ is taken for visible content and a sparser set of virtual pixel samples $S_o$ for unobserved content. As used herein, visible content generally refers to a view of content currently viewed by a user, while unobserved content generally refers to content outside the current view of the user.

The number of samples to obtain in association with the visible content and the number of samples to obtain in association with the unobserved content can be determined in any number of ways. In one embodiment, around 100 samples are taken for visible content and around 7 samples are taken for unobserved content even though the area of the unobserved content is around four times larger than the area of the visible content. In other embodiments, the density difference between the visible content and the unobserved content can be predetermined based on the content and size of the virtual environment. Sampling can be performed using, for example, a user device to scan the virtual environment and select virtual pixels for sampling.

Mapping component 214 can be utilized to perform dynamic mapping. In particular, dynamic mapping can be performed using the obtained or selected pixel samples. The mapping component can be configured to map virtual environment pixels to a real-world space points such that virtual environment pixel $x=(x, y) \in S_v$ is mapped to real-world point $u=(u, v) \in S_r$, where $S_v$ and $S_r$ represent two-dimensional planar regions. Such mapping can be surjective in that multiple virtual environment pixels can be mapped to a single real-world point. As can be appreciated, $S_v$ can include samples $S_f$ for visible content and $S_o$ for unobserved content. For computational purposes, the virtual environment and real-world space can be represented as polygonal shapes for the purposes of dynamic mapping. These polygonal shapes can then be extracted as convex/non-convex hulls from scanned data or design figures. In this way, a virtual environment pixel can be mapped to a real-world point. An exemplary equation for performing this mapping is:

$$u = f(x) = \sum_{i=1}^{p} c_i b_i(x) + Tx,$$

$$b_i(x) = e^{\frac{-|x-x_i|^2}{2s^2}}$$

Such equation for f(x) utilizes an analytical computation of Jacobians and Hessians where $\{B_i\}$ are basis functions with weights $\{c_i\}$, and T is an affine transformation matrix. Gaussians are used for $b_i(x)$ such that $x_i$ is the i-th basis center and x is a sample point in $S_v$. Such an equation can be applied as a warping function such that virtual environment pixels can be mapped to real-world points in a surjective manner to generate a dynamic map between the virtual environment and the real-world space.

Quality component 216 can be utilized to determine the quality of a dynamic map. Quality can be determined by analyzing shape preservation, static object boundaries, and dynamic object boundaries. Quality can be used to indicate how much warping or distortion exists in the virtual scene being mapped. In other words, quality can indicate how realistic a virtual scene will appear to a user. As such, quality can be used to optimize the dynamic mapping between the virtual environment and the real-world space.

Shape preservation can be based on perceptual thresholds and expectations for allowable distortion of virtual environment objects (e.g., walls can be curved without significant disruption for a user whereas furniture cannot be warped without disrupting the realism of the virtual experience for the user). An example equation for determining an extent of shape preservation is:

$$E_s = \sum_{x \in S_f} w(x) \left( \|J(x)\|^2 + \frac{\|J(x)\|^2}{(det \|J(x)\|)^2} \right)$$

Utilizing such an equation, distorted weights, w, can be assigned to virtual objects in the virtual environment. Such an equation can indicate the energy of measured scene distortion. When this energy is minimized, there can be an isometric mapping which will preserve shapes within the virtual scene of the virtual environment.

Static object boundaries generally refer to the outline of real-world static object. Static object boundaries can be analyzed to ensure that real-world objects that are not mapped to virtual objects are avoided by a user moving through a virtual environment. For instance, if a real-world chair exists and there are no virtual chairs in the virtual environment, the real-world chair can be treated as an object to be avoided as there is not virtual object to map the real-world chair to increase realism. One example of a static object boundary is a real-world wall. In such a case, when performing dynamic mapping, the entire map should fall within the bounds of the real-world walls. An example equation for determining an extent of static object boundaries avoidance is:

$$E_B = \sum_{l_i} \sum_{x \in S_f \cup S_o} \frac{2}{d(x, l) + \sqrt{d(x, l)^2 + \epsilon}}$$

In such an exemplary equation, $l_i$ is the l-th starting/ending point of the physical boundary polygon, $d(x, l)$ is a signed distance from $f(x)$ to the boundary edge of the real-world space. $\epsilon$ can be a small positive number used to penalize negative distances. Using such an equation can ensure that each mapped point $f(x)$ is mapped to a real-world point that is actually within the real-world space.

Dynamic object boundaries generally refer to the outline of real-world objects that are capable of moving. Dynamic object boundaries can be analyzed to ensure any change to the position of a dynamic real-world object is reflected in the virtual environment. A dynamic real-world object can be any real-world object capable of being moved and/or changing position within a real-world space (e.g., a person, a chair, a desk, a bed, etc.). For example, if multiple users are within the same real-world space, analyzing dynamic real-world objects ensures users do not collide with each other or any real-world objects that have been moved (e.g., a real-world chair that has been moved). An example equation for determining an extent of avoidance of dynamic object boundaries is:

$$E_O = \sum_{x \in S_f} \exp\left(\frac{-1}{2\sigma^2}\left(\frac{x}{o}\right)\right)$$

In such an exemplary equation, a Gaussian barrier function can be used where o is the width-length vector of an object's size. A camera can be used to track real-world objects so that o can be determined. Utilizing such an equation allows for real-time dynamic mapping that incorporates real-time changes to real-world objects in the real-world space. As such, dynamic mapping can be adaptive to real-time environmental changes in the real world.

Upon analyzing shape preservation, avoidance of static object boundaries, and avoidance of dynamic object boundaries, quality component 216 can determine an overall quality of a dynamic mapping. One manner of determining quality is by determining energy (E) of the combined terms. Energy E can be determined by aggregating the terms for the extent for shape preservation ($E_s$), avoidance static object boundaries ($E_B$), and avoidance dynamic object boundaries ($E_o$) using a linear sum:

$$E = a_0 E_s + a_1 E_B + a_2 E_o$$

In such an equation, $a_0$, $a_1$, and $a_2$ are constant numbers that can be adjusted based on the properties of the objects in the real-world space (e.g., static or dynamic). For example, when none of the objects in the real-world space are dynamic, $a_0$ can be set to $a_0=10$, $a_1$ can be set to $a_1=1$, and $a_2$ can be set to $a_2=0$. It should be appreciated that when there are not any dynamic objects in a real-world space, $E_o$ will also equal zero. In another example, when at least one object in the real-world space is dynamic, $a_0$ can be set to $a_0=1$, $a_1$ can be set to $a_1=1$, and $a_2$ can be set to $a_2=50$. The lower this energy E, the better the quality of the dynamic mapping. As such, quality can be utilized to optimize dynamic mapping between a virtual environment and a real-world space such that the dynamic map with the lowest energy can be designated as an optimized dynamic map.

In some embodiments, an extent of scene fitting for retargeting a virtual environment to better fit a real-world space can also be incorporated into the quality determination. For instance, image seam carving can be utilized to reduce distal and angular distortion. The RGBZ image (e.g., image with scene depth) for each wall can be considered so that a carving sequence can be pre-computed. This carving sequence can allow for retargeting the walls at run-time to better fit dynamic user position(s) as well as the real-world space. The extent of such a carving sequence can also be incorporated into the quality determination of the dynamic mapping.

As shown, rendering engine 208 can include rigidity component 218, matching component 220, real video component 222, and blending component 224. The foregoing components of the rendering engine can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. It should be appreciated that while rigidity component, matching component, real video component, and blending component are depicted as a separate components, in implementations, the functionality of these components can be performed using a single components and/or additional components.

Rendering engine 208 is generally configured to utilize a dynamic map to perform real-time rendering of a virtual scene of a virtual environment for display on a user device. An image can be rendered for a virtual scene using a dynamic map such that as a user moves around a virtual environment and virtual scenes are presented to the user, the user is also directed around the real-world space in a manner that real-world objects can be avoided, aligned with virtual scene objects, and/or incorporated into the rendering (e.g., importantly large-scale real-world objects).

Rigidity component 218 can be utilized to determine rigid virtual scene objects in a virtual scene of the virtual environment to be rendered. The rigidity component can also be used to determine deformable virtual scene objects. Rigid virtual scene objects can include those objects that should not be warped due to visual disruption to a user (e.g., warping a chair will lessen the realism of a virtual-based experience as the chair will not mimic a real-world chair due to visual distortion). Deformable virtual scene objects can include those objects that can be warped without causing significant visual disruption to a user (e.g., warping a wall is possible without lessening the realism of the virtual-based experience). During rendering, such rigid virtual objects can be removed from the scene. In embodiments, this step can be the first pass of a multi-pass rendering process. Advantageously, removing rigid virtual objects from a virtual scene exposes more pixels of deformable objects (e.g., walls) to the camera reducing disocclusion artifacts by allowing additional pixels to be used during rendering of the deformable objects. After rigid virtual objects have been removed from the virtual scene, the dynamic mapping between the virtual environment and the real-world space can be applied as a warping function (e.g. dynamic mapping determined by mapping component 214) to the deformable virtual scene objects.

After deformable virtual scene objects have been rendered using the dynamic mapping applied using a warping function, the second pass of a multi-pass rendering process can be used to replace the rigid virtual objects. Matching component 220 can be configured to replace such rigid virtual objects. The matching component can perform matching between real-world objects and virtual objects in the virtual scene when replacing the rigid virtual objects. In one embodiment, tracking markers can be used such that cameras can detect three-dimensional positions of real-world objects. Upon determining the position of a real-world object, matching component can attempt to match the real-world object with a virtual object using a list of pre-defined virtual objects and the virtual object positions. One method for matching can utilize comparing the height values of the real-world object with height values of virtual objects. For example, if the height value of a real-world chair and the height value of a virtual chair are within a predetermined threshold of each other, matching component can match the real-world chair and the virtual chair. As such, when a real-world object and a virtual object match, matching component can place the virtual object in the location of the real-world object.

Real video component 222 can provide video of a real-world space based on a user's position within the real-world space. For example, such a real video component can be the real-world frame the user would see if not viewing a virtual-based experience via a user device. Such a real-world frame can be incorporated during the rendering process depending on the type of virtual experience. For instance, in a VR experience, real-world elements from the real-world are typically not displayed to the user in conjunction with the virtual scene. In an AR or MR experience, real-world elements from the real-world can be incorporated with the virtual scene.

Blending component 224 can be used to generate a rendered scene for displaying to a user via a user device. In embodiments, blending can be the third pass of a multi-pass rendering process. Blending component is capable of rendering a virtual scene based on the image-based rendering of deformable virtual scene objects, such as that performed by rigidity component 218, replacement of rigid virtual scene objects, such as that performed by matching component 220, and any real-world elements from a real-world frame, such as that provided by real video component 222. In embodiments, utilizing some real-world visual aspects (e.g. provided using real-world video), blending component can utilize matching between real-world objects and virtual scene objects to increase/decrease transparency/opacity. For example, when the virtual view and real-world view are aligned such that the user is looking at a corner where two walls join in both the real-world and virtual scene, transparency of the virtual scene can be increased such that the user can see the alignment between the real-world corner and virtual corner. Such alignment can allow for interaction with the corner by the user, increasing realism. For instance, aligning the corner in this way with some degree of transparency can allow a user to reach out and touch the real-world corner while visualizing touching the virtual corner. Advantageously, such alignment allows for haptic feedback increasing realism of the virtual experience. When there is poor matching between a real-world object and a virtual object, opacity can be increased such that a user will be unaware of any disparities between the real-world and the virtual scene.

Further, when necessary rendering engine 208 can utilize a dynamic map to generate a reverse map for a user moving through a virtual environment. When walking through a virtual environment, a reverse map can be generated from a dynamic map. A reverse map can be used when the dynamic map has multiple virtual pixels mapped to a single real-world point such that multiple solutions can exist for each real-world point. Additionally, a reverse map can minimize perception angle and distance distortion during movement though a virtual environment. A user's position and orientation can be tracked in the real-world along with a corresponding virtual position. As such, as a user moves throughout a virtual environment, a reverse map from the current user position in the real world, $S_r$, to the user position in the virtual environment, $S_v$, can be used.

Figure 3:
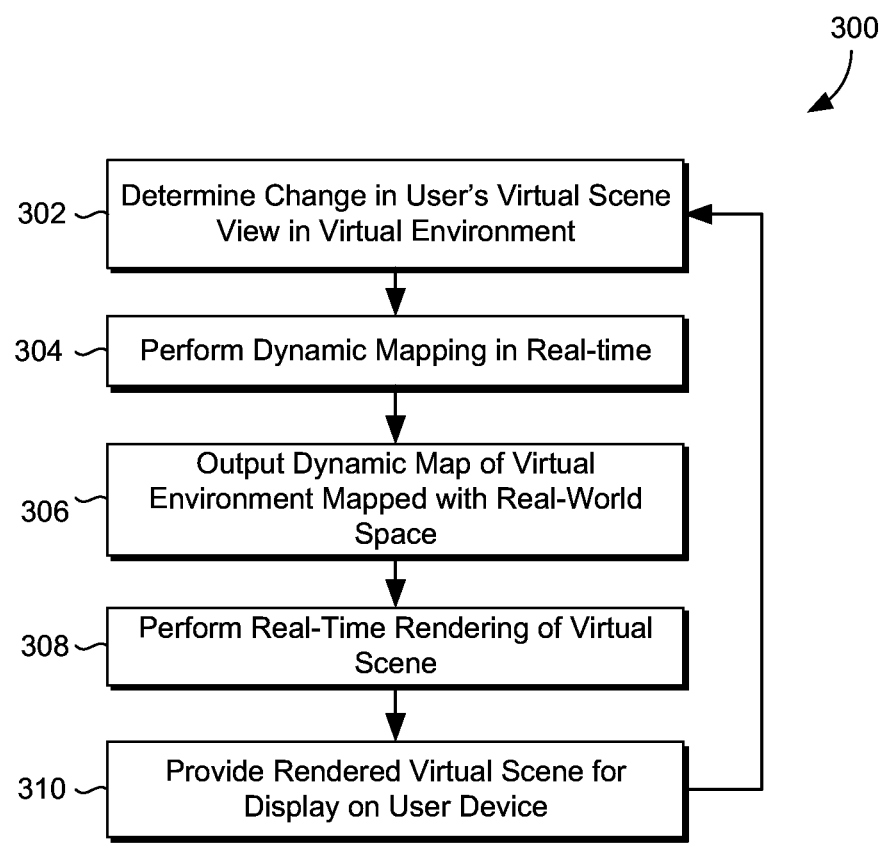
FIG. 3 illustrates a process flow showing an embodiment for performing dynamic mapping, in accordance with embodiments of the present disclosure.

With reference to FIG. 3, a process flow is provided showing an embodiment of method 300 for dynamic mapping between a virtual environment and a real-world space and rendering a visualization of a virtual scene of the virtual environment utilizing the dynamic mapping, in accordance with embodiments of the present disclosure. Method 300 can be performed, for example by dynamic mapping system 204, as illustrated in FIG. 2.

At block 302, a change in a user's virtual scene view within virtual environment can be determined. Such a change can be received from a user device. A change in a user's view can be due to the user moving within the virtual environment and/or the real-world space. A change in a user's view can also be due to another user moving within the virtual environment and/or the real-world space. Further, a change in a user's view can be due to a virtual object and/or a real-world object being moved. Such a change can be captured by a user device (e.g., using a real-world and/or virtual camera of the user device).

At block 304, the dynamic mapping can be performed in real-time. Dynamic mapping can be performed using, for example, dynamic mapping engine 206 as depicted in FIG. 2. During dynamic mapping, virtual environment pixels can be surjectively mapped to real-world space points. Surjective mapping indicates that multiple virtual environment pixels can be mapped to the same real-world space point. Surjective mapping allows for mapping virtual environments that are larger than the real-world space. It should be appreciated that bijective mapping can also be used when appropriate, such as when the virtual environmental is not larger than the real-world space (e.g., when there can be a one-to-one mapping of virtual pixels to real-world points). In dynamic mapping, the virtual scene within a user's view is prioritized over spaces of the virtual environment outside of the user's view due to occlusion (e.g., by depth) and/or clipping (e.g., by camera frustum). As such, a denser set of sample virtual environment points are taken for visible content and a sparser set of sample points for invisible content. As such, there are more virtual environment points from the visible content to map to real-world space points. Dynamic mapping can be performed by matching virtual environment pixels to real-world space points using, for example, exemplary equation as discussed with reference to dynamic mapping engine 214 of FIG. 2. Such an equation can be applied as a warping function such that virtual environment pixel x can be mapped to real-world point u to generate a dynamic map between the virtual environment and the real-world space.

The quality of a dynamic mapping can be determined by analyzing shape preservation, avoidance of static object boundaries, and dynamic object boundaries. Shape preservation can indicate an extent to which dynamic mapping maintains perceptual thresholds and expectations for allowable distortion of virtual scene objects (e.g., walls can be curved without significant disruption for a user whereas furniture cannot be warped without disrupting the realism of the virtual experience for the user). Static object boundaries avoidance can be analyzed to ensure that real-world objects that cannot be mapped to virtual objects are avoided by a user moving through a virtual environment. Dynamic object boundaries can be analyzed in real-time to ensure any changes to the position of a dynamic real-world object are reflected in the virtual environment. In some embodiments, a carving sequence for image seam carving can also be incorporated into the quality determination to allow for retargeting the walls at run time to better fit dynamic user positions as well as the real-world space. At block 306, the dynamic map of the virtual scene mapped with a real-world space can be output.

At block 308, real-time rendering of the virtual scene can be performed. Rendering can be used to generate a visualization of a virtual scene of a virtual environment utilizing a dynamic mapping between the virtual environment and a real-world space.

Rendering can be performed using a multi-pass process. In the first pass of rendering, rigid virtual scene objects in the virtual scene can be determined and removed from the virtual scene. Removing rigid virtual objects exposes more pixels of deformable virtual objects (e.g., walls) to the camera. Advantageously, exposing additional pixels of deformable virtual objects can reduce disocclusion by allowing additional pixels to be used during the image-based rendering of the deformable objects. After removing the rigid virtual objects, dynamic mapping can be applied between the deformable objects of the virtual environment and the real-world space. One manner of applying this dynamic mapping is using, for example, a warping function based on the dynamic map (e.g., applying $u=f(x)=\sum_{i=1}^{P} c_i b_i (x) + Tx$).

After image-based rendering is performed on the deformable objects, the second pass of the multi-pass rendering process can be used to replace the rigid virtual objects. In embodiments, when replacing the rigid virtual objects, the rigid virtual objects can be placed according to the locations of real-world objects, importantly large-scale real-world objects (e.g., if the rigid virtual object is a chair, the virtual chair can be replaced at a location of a real-world chair). Such replacement can use matching between real-world objects and virtual objects in the virtual scene. In one embodiment, tracking markers can be used such that cameras can detect the three-dimensional positions of real-world objects. Upon determining the position of a real-world object, the real-world object can be compared a list of pre-defined virtual objects (e.g., the list including virtual object positions and dimensions). One method for matching can utilize comparing the height value of the real-world object with height values of virtual objects. Real-world video can also be used in the rendering process depending on the type of virtual experience (e.g., typically in VR, real-world elements are not displayed to a user in conjunction with a virtual scene whereas in an AR or MR experience, typically real-world elements can be incorporated with a virtual scene).

Finally, blending can occur as a third pass of the multi-pass rendering process when there is good matching between real-world objects and virtual scene objects to increase/decrease transparency/opacity.

At block 310, the rendered virtual scene can be provided to a user device for display. In embodiments, the rendered virtual scene can be provided to the user device by a server that performs the rendering. In other embodiments, the user device can output the rendered virtual scene. In still further embodiments, rendering can take place using a combination of a server(s) and user device.

Figure 4:
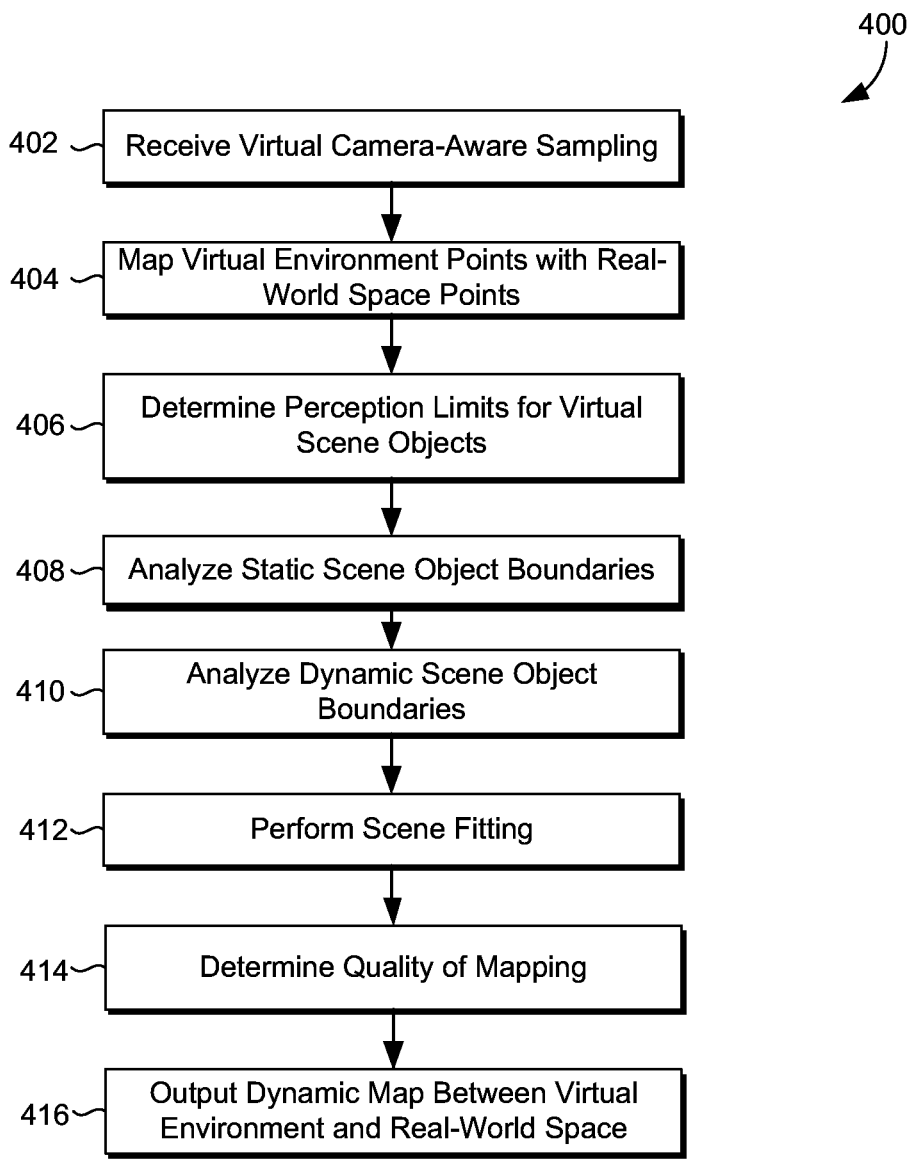
FIG. 4 illustrates a process flow showing an embodiment for performing dynamic mapping between a virtual environment and a real-world space, in accordance with embodiments of the present disclosure.

With reference to FIG. 4, a process flow is provided showing an embodiment of method 400 for performing dynamic mapping between a virtual environment and a real-world space, in accordance with embodiments of the present disclosure. Method 400 can be performed, for example by dynamic mapping engine 206 of dynamic mapping system 204, as illustrated in FIG. 2. Method 400 is capable of being performed in real-time.

At block 402, virtual camera-aware sampling can be received. During dynamic mapping, sampled virtual environment pixels are surjectively mapped to real-world space points. In dynamic mapping, the virtual scene within a user's view is prioritized over the virtual environment out of view due to occlusion (e.g., by depth) and/or clipping (e.g., by camera frustum). Due to this prioritization, when sampling a occurs for a virtual environment, a denser set of virtual scene pixel samples are taken for visible content and a sparser set of pixel samples are taken for invisible content. For example, around 100 samples can be taken for visible content and around 7 samples can be taken for invisible content, even though the area of the invisible content is often significantly larger than the area of the visible content (e.g., invisible content can contain four times or more content that visible content). The density difference between visible content samples and invisible content samples can be pre-determined based on the content and size of the scene.

At step 404, virtual environment points can be mapped to real-world space points. Such mapping can be used such that virtual environment pixel $x=(x, y) \in S_v$ is mapped to real point $u=(u, v) \in S_r$. $S_v$ can be comprised of the samples for visible content and the samples for invisible content. In this way x can be mapped to u using, for example:

$$u = f(x) = \sum_{i=1}^{P} c_i b_i(x) + Tx,$$

$$b_i(x) = e^{\frac{-|x-x_i|^2}{2s^2}}$$

At block 406, the extent to which virtual scene objects are within perception limits can be analyzed based on the dynamic mapping. Virtual objects have varying perceptual thresholds and expectations for allowable distortion depending on the virtual scene object. Analyzing an extent to which virtual scene objects are within these perception limits can indicate the success of mapping, where success can be measured in how realistic of virtual scene objects appear.

At block 408 the extent to which static scene object boundaries are avoided can be analyzed based on the dynamic mapping. Static object boundaries can be analyzed to ensure that real-world objects that cannot be mapped to virtual objects are avoided by a user moving through a virtual environment (e.g., the map generated during dynamic mapping should fall within the bounds of the real-world walls).

At block 410 the extent to which dynamic scene object boundaries are avoided can be analyzed based on the dynamic mapping. Dynamic object boundaries can be analyzed in real-time to ensure any changes to the position of a dynamic real-world object are reflected in the virtual environment. For example, if multiple users are within the same real-world space, analyzing dynamic real-world objects ensures users do not collide with each other or any real-world objects that have been moved (e.g., a real-world chair that has been moved).

At block 412, the extent to which scene fitting should be performed can be analyzed based on the dynamic mapping. In an embodiment, scene fitting can be performed using image seam carving to reduce distal and angular distortion. For each wall of the virtual scene, a carving sequence can be pre-computed. This carving sequence can be used to allow for retargeting the walls at run time to better fit dynamic user positions as well as the real-world space.

At bock 414, the quality of the mapping can be determined. In an embodiment, overall quality of a map generated using dynamic mapping can be based on shape preservation, static object boundaries, dynamic object boundaries, and/or scene fitting. Quality of a map can be indicated using on an amount of energy for the dynamic map (e.g., a low amount of energy can indicate a high quality map). Such a quality determination can be used to optimize the dynamic mapping between the virtual environment and the real-world space.

At block 416, a dynamic map between a virtual scene and a real-world space can be output. Such a dynamic map can be an optimized map, as indicated using a quality determination.

Figure 5:
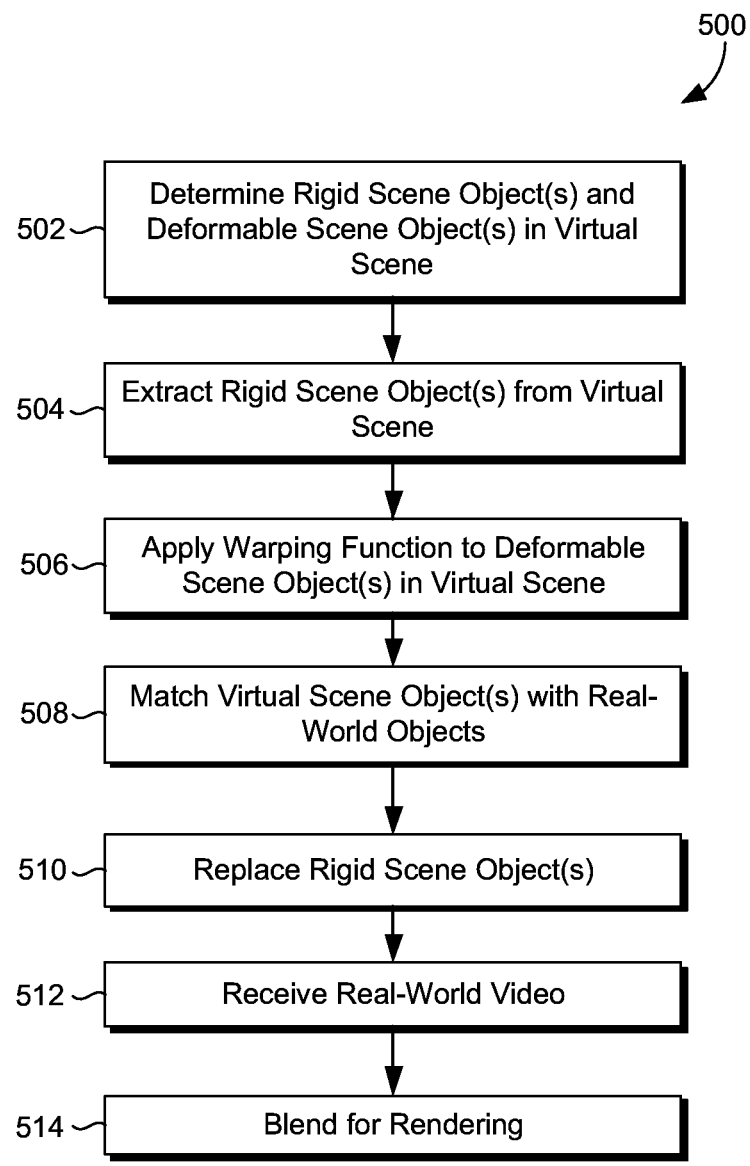
FIG. 5 illustrates a process flow showing an embodiment for rendering a virtual scene of a virtual environment utilizing a dynamic mapping between the virtual environment and a real-world space, in accordance with embodiments of the present disclosure.

With reference to FIG. 5, a process flow is provided showing an embodiment of method 500 for rendering a virtual scene utilizing a dynamic mapping between the virtual environment and a real-world space, in accordance with embodiments of the present disclosure. Method 500 can be performed, for example by rendering engine 206 of dynamic mapping system 204, as illustrated in FIG. 2.

At block 502, any rigid scene object(s) and any deformable scene object(s) in a virtual scene can be determined. Rigid virtual scene objects can include those objects that should not be warped due to visual disruption to a user (e.g., warping a chair will lessen the realism of the virtual experience as the chair will not mimic a real-world chair due to visual distortion). Deformable virtual scene objects can include those objects that can be warped without causing significant visual disruption to a user (e.g., warping a wall is possible without lessening the realism of the virtual experience).

At block 504, rigid scene object(s) can be extracted from the virtual scene. In embodiments, this extraction can be the first pass of a multi-pass rendering process. Removing rigid virtual objects from the virtual scene exposes more pixels of deformable objects (e.g., walls) to the camera which reduces distortion by allowing additional pixels to be used during rendering of the deformable objects. Exposing additional pixels of deformable virtual objects can reduce distortion by allowing additional pixels to be used during rendering of the deformable objects.

At block 506, dynamic mapping between the virtual environment and a real-world space can be applied to deformable scene object(s) in the virtual scene. Dynamic mapping can be applied using a warping function based on the dynamic mapping of the virtual environment to the real-world space. Such a warping function can be applied after rigid virtual objects have been removed from the virtual scene. An exemplary warping function to apply to the deformable virtual scene objects can be $u=f(x)=\Sigma_{i=1}^{P} c_i b_i(x)+Tx$.

At block 508, virtual scene object(s) can be matched with real-world objects, importantly large-scale real-world objects. This matching can be the part of the second pass of a multi-pass rendering process. In embodiments, tracking markers can be used such that cameras can detect three-dimensional positions of real-world objects. Upon determining the position of a real-world object, real-world objects can be matched with a virtual object using a list of pre-defined virtual objects in the virtual scene. One method for matching can compare the height value of a real-world object with height values of virtual objects. For example, if the height value of a real-world chair and the height value of a virtual chair are within a predetermined threshold of each other, matching component can match the real-world chair and the virtual chair. In other embodiments, if there is not good matching between a real-world object and a virtual scene object, the real-world object can be treated as an obstacle to be avoided.

At block 510, rigid scene object(s) can be replaced back into the scene using matching as determine, for example, at block 508. In embodiments using a multi-pass rendering process, after deformable virtual scene objects have had the warping function applied, the second pass of a multi-pass rendering process can be used to replace rigid virtual objects in the virtual scene. In embodiments, when replacing the rigid virtual objects, the rigid virtual objects can be placed according to the locations of real-world objects (e.g., if the rigid virtual object is a chair, the virtual chair can be replaced at a location of a real-world chair). Such replacement of the rigid virtual objects can use matching, such as that described with reference to block 508.

At block 512, real-world video can be received. Real-world video can be used in the rendering process depending on the type of virtual experience (e.g., typically in VR, real-world elements are not displayed to a user in conjunction with a virtual scene whereas in an AR or MR experience, typically real-world elements can be incorporated with a virtual scene).

At block 514, blending can occur as a third pass of a multi-pass rendering process when there is good matching between real-world objects and virtual scene objects to increase/decrease transparency/opacity. In embodiments, such a process can be applied when AR displays are being used to view the rendered virtual scene. In this way, rendering for AR allows for adaptively controlling the rendering transparency based on whether or how much to overwrite a real-world space with virtual objects and/or virtual scene.

Figure 6A:
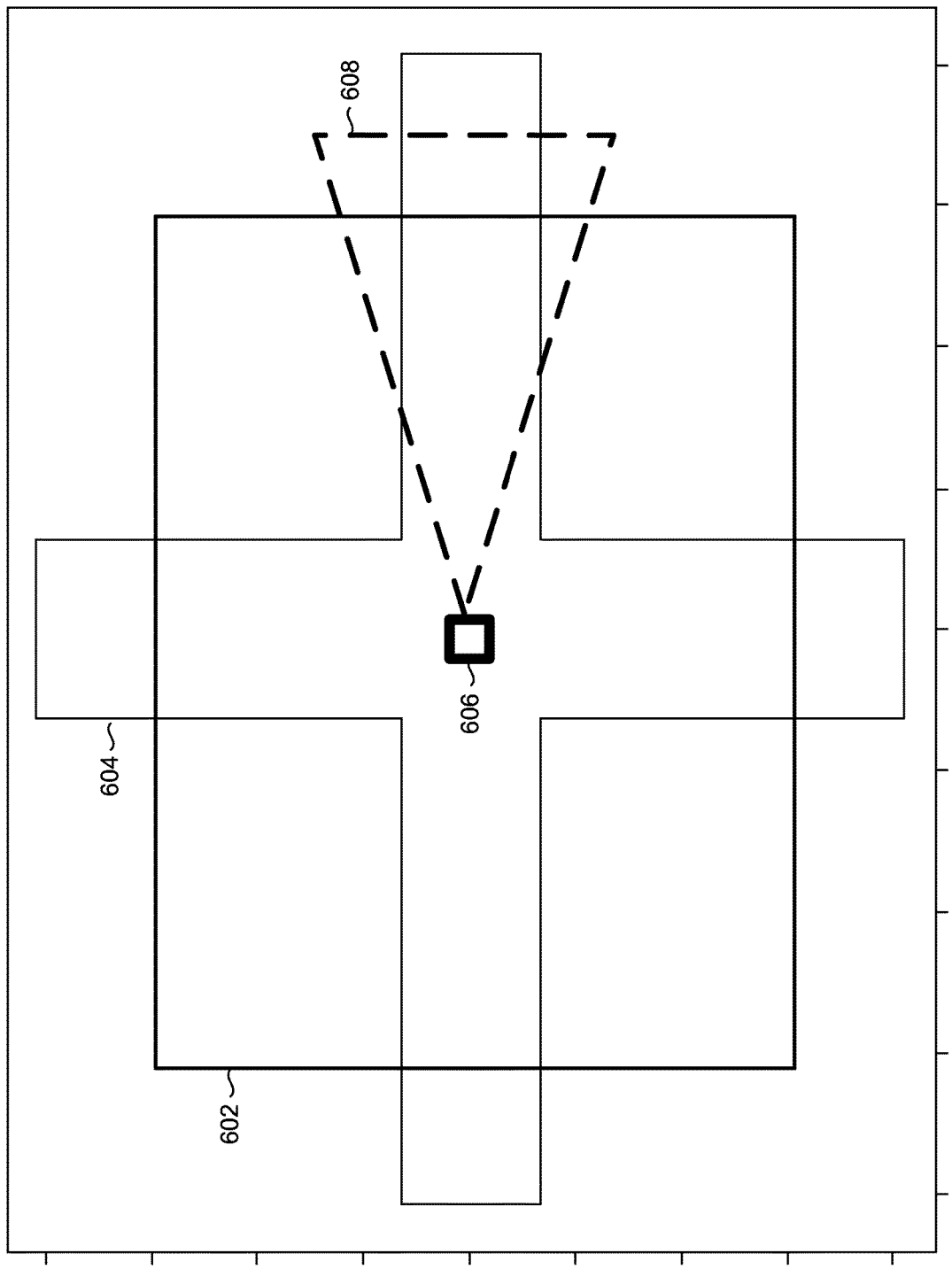
FIG. 6A illustrates an example dynamic mapping between a virtual environment and a real-world space, in accordance with embodiments of the present disclosure.
Figure 6B:
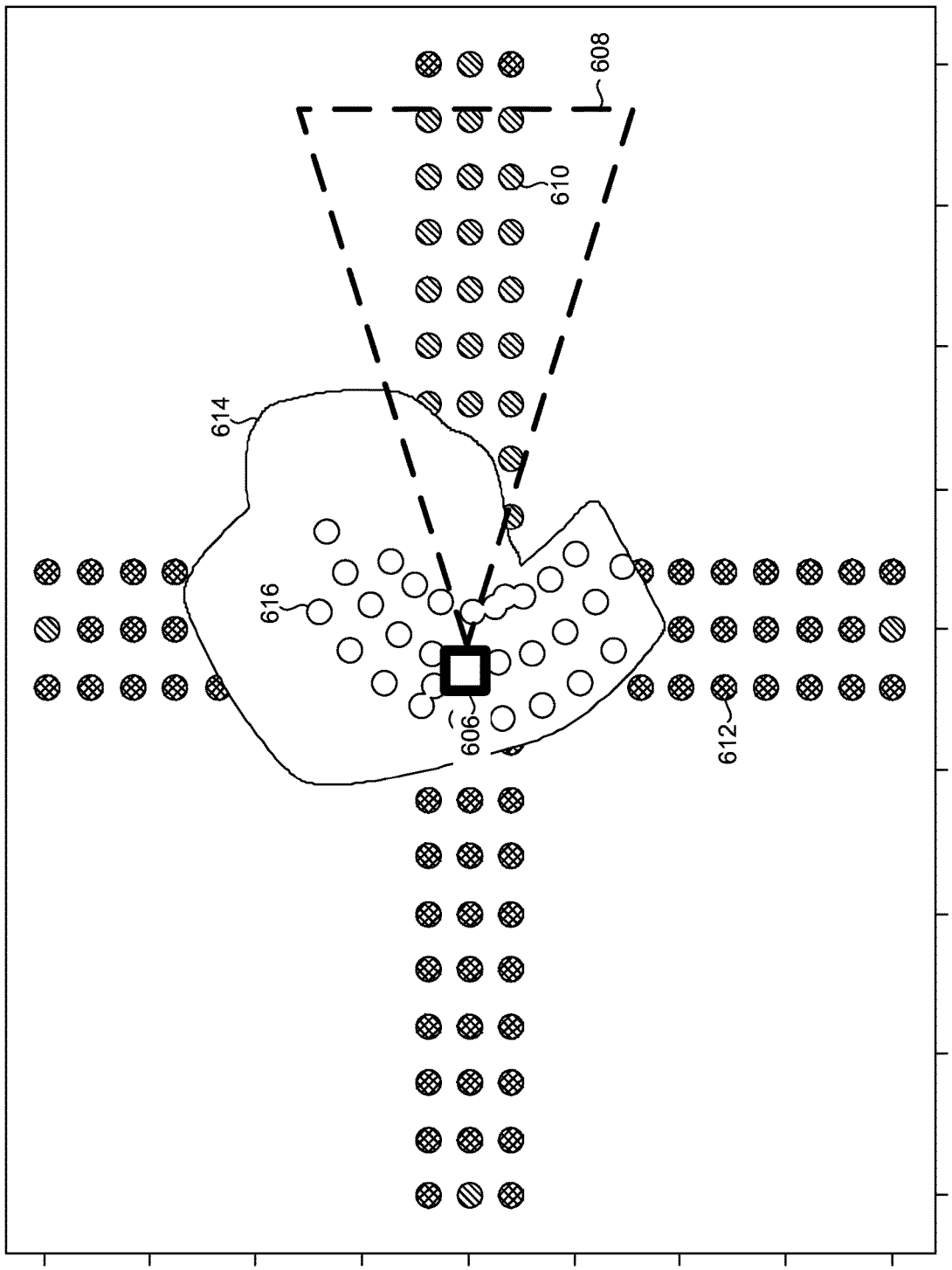
FIG. 6B illustrates an example dynamic mapping between a virtual scene and a real-world space, in accordance with embodiments of the present disclosure.
Figure 6C:
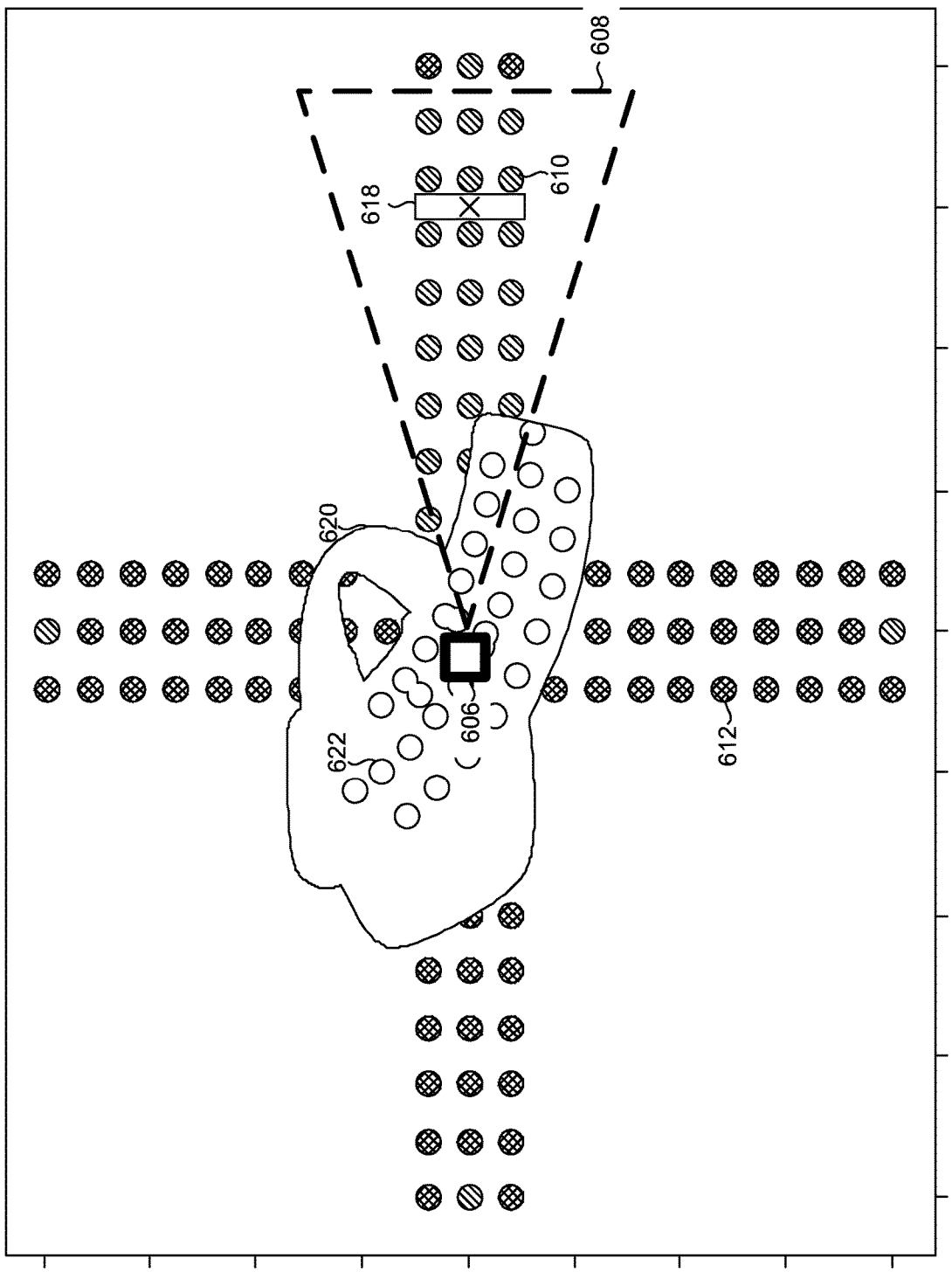
FIG. 6C illustrates an example dynamic mapping between a virtual environment and a real-world space, in accordance with embodiments of the present disclosure.

FIGS. 6A-6C depict illustrative dynamic mapping between a virtual environment and a real-world space, in accordance with embodiments of the present disclosure. FIG. 6A depicts a dynamic mapping between a virtual environment and a real-world space. Real-world space 602 indicates the area in which user 606 is able to physically move around in while exploring a virtual environment. As illustrated, cross 604 indicates the virtual environment. Triangle 608 indicates user 606's virtual scene view.

FIG. 6B depicts a dynamic mapping between a virtual environment and a real-world space. Dynamic mapping can be a type of surjective mapping of virtual environment pixels to real-world space points. In dynamic mapping, the virtual scene within user 606's view, as depicted using triangle 608, is prioritized over spaces of the virtual environment outside user 606's view. When sampling occurs, virtual pixels within a current viewing scene of the virtual environment can be prioritized over virtual pixels outside of the current viewing scene. Sample 610 represents a virtual sample. As depicted, sampling of virtual environment points is denser within triangle 608, the virtual scene within user 606's view, than sampling outside user 606's view. Virtual point 612 is outside of user 606's view and, as depicted, is not a sampled virtual point. Outline 614 depicts the warped virtual environment. Point 616 represents the location of one of one of the mapped samples, such as sample 610. The remainder of outline 614 is made up of the non-sampled points of the scene, such as 612.

FIG. 6C depicts a dynamic mapping between a virtual environment and a real-world space. An advantage of dynamic mapping is an increase in computational efficiency, allowing the mapping to be performed in real-time. Dynamic mapping in real-time allows for dynamic changes in the real-world space to be taken into account during mapping. For instance, when door 618 is opened, the dynamic mapping will be performed in real-time to update from the dynamic mapping as depicted in FIG. 6B where the door is closed. Outline 620 depicts the warped virtual environment. The interior hole wraps around a physical obstacle such as a person walking into the room. Point 622 represents the location of one of the mapped samples, such as sample 610. The remainder of outline 620 is made up of the non-sampled points of the scene, such as 612. As depicted, dynamic mapping is able to incorporate changes to the real-world space in real-time (e.g., compare outline 614 and associated mapped samples with outline 620 and associated mapped samples).

Figure 7A:
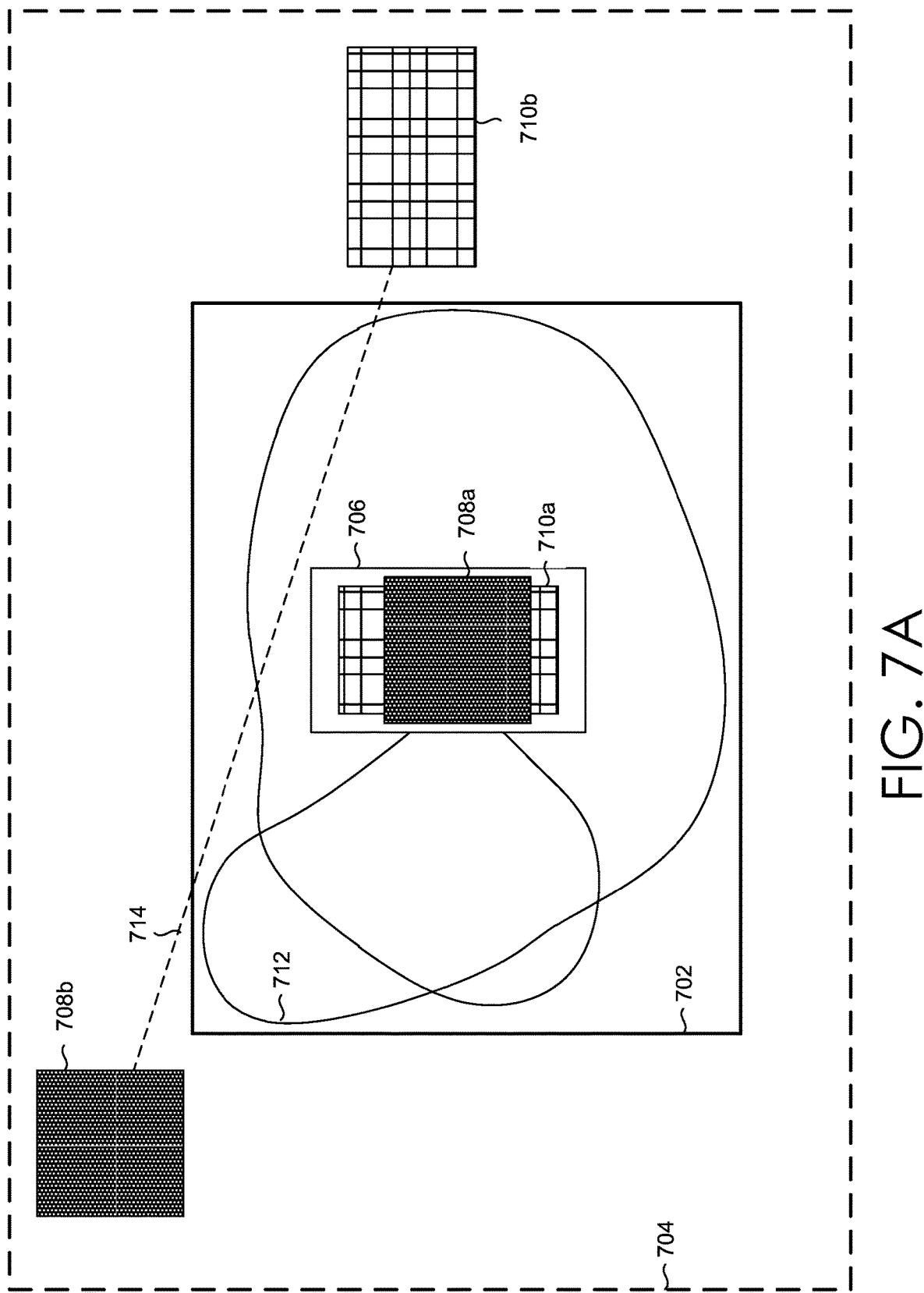
FIG. 7A illustrates an example dynamic mapping with a long path between a virtual environment and a real-world space with one real-world static object, in accordance with embodiments of the present disclosure.
Figure 7B:
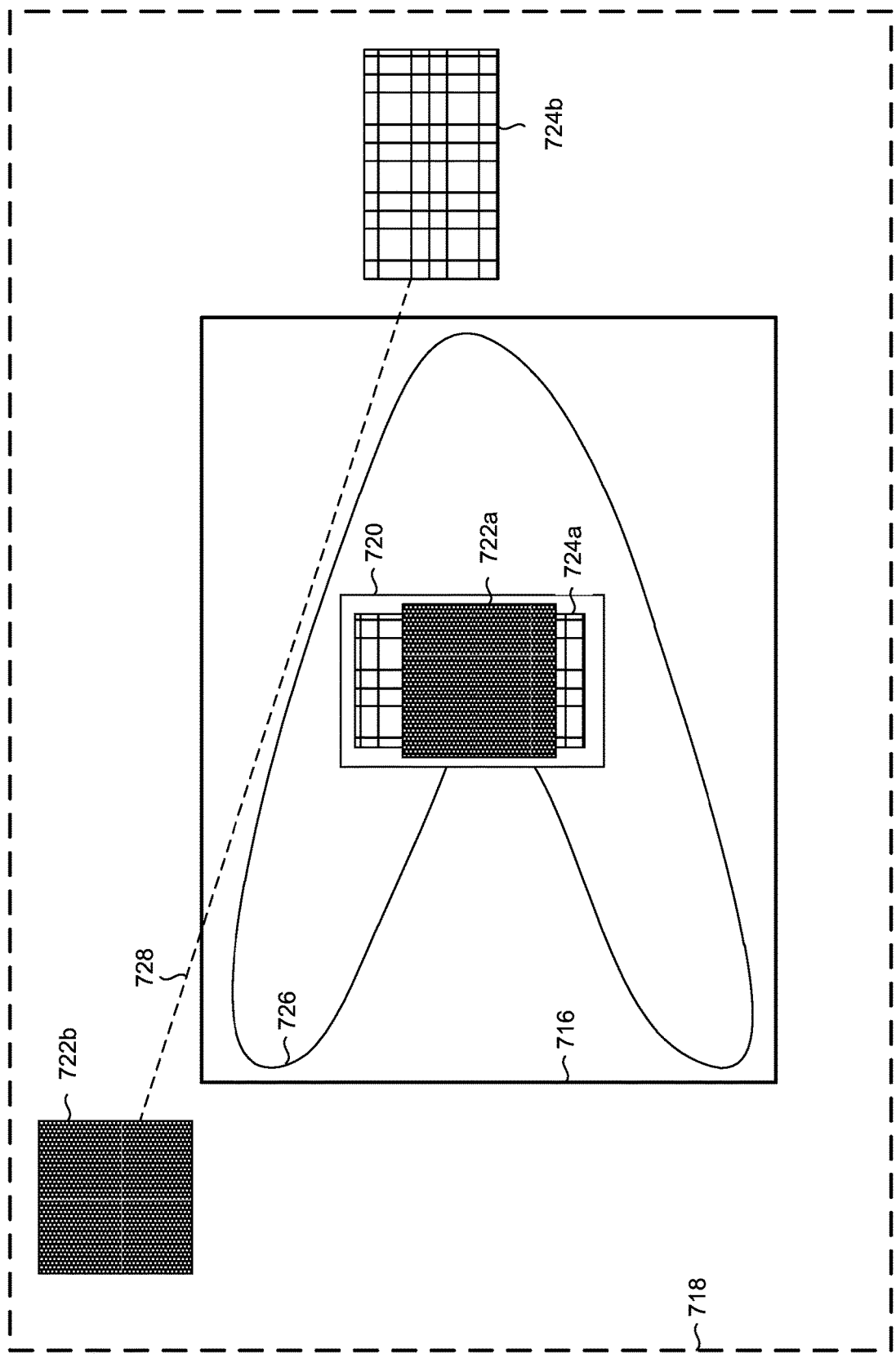
FIG. 7B illustrates an example dynamic mapping with a shorter path between a virtual environment and a real-world space with one real-world static object, in accordance with embodiments of the present disclosure.
Figure 7C:
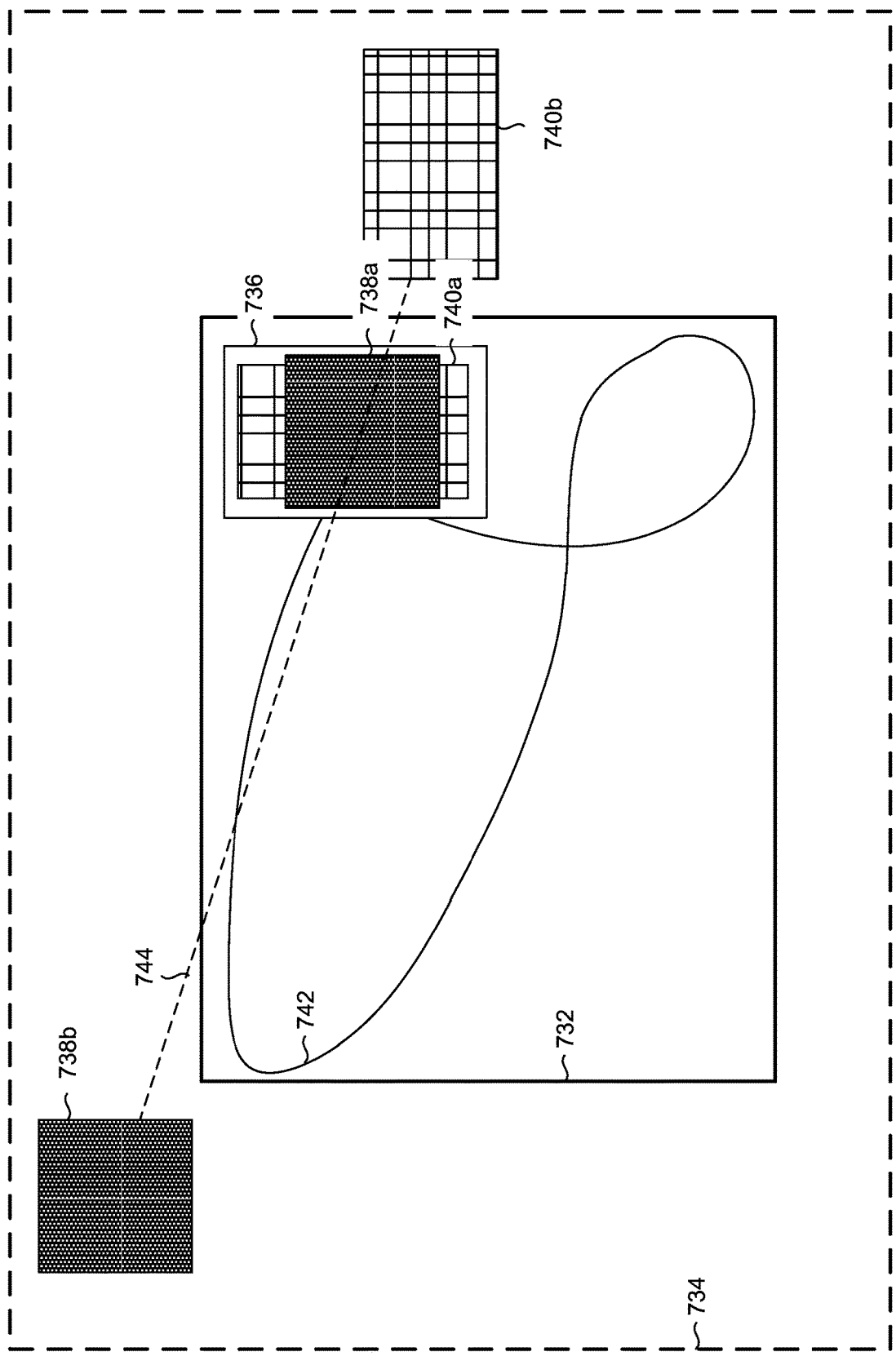
FIG. 7C illustrates an example dynamic mapping between a virtual environment and a real-world space with a dynamic real-world object, in accordance with embodiments of the present disclosure.

FIGS. 7A-7C depict illustrative utilization of dynamic mapping between a virtual environment and a real-world space to generate real-world paths that correlates with virtual paths through the virtual environment, in accordance with embodiments of the present disclosure. FIG. 7A depicts utilizing a dynamic mapping between a virtual environment and a real-world space to generate a long real-world path where the real-world space has one real-world static object. Real-world space 702 indicates the area in which a user is able to physically move around in while exploring virtual environment 704. Within virtual environment 704 there is a virtual table 708 and a virtual bed 710. Within real-world space 702 there is a real-world bed 706. As depicted, real-world bed 706 can be designated as a static real-world object. Dynamic mapping can be performed as described with reference to FIG. 2-5, generating real-world walking path 712. A user can move through virtual environment 704 using redirected walking such that while the user walks along real-world walking path 712, the user visualizes virtual path 714. Dynamic mapping can be utilized such that both virtual table 708 and virtual bed 710 are mapped to real-world bed 706. Real-world walking path 712 utilizes a longer path through real-world space 702. Advantageously, using a longer path can increase the realism that one real-world object is being mapped to two virtual objects, virtual table 708 and virtual bed 710. As such, a user will visualize in the virtual environment movement from virtual table 708b to virtual bed 710b along virtual path 714 even though in the real-world the user is walking from virtual table 708a, placed where real-world bed 706 is located in the real-world, to virtual bed 710a, placed where real-world bed 706 is located in the real-world, along real-world walking path 712.

FIG. 7B depicts utilizing a dynamic mapping between a virtual environment and a real-world space to generate a shorter real-world path where the real-world space has one real-world static object. Real-world space 716 indicates the area in which a user is able to physically move around in while exploring virtual environment 718. Within virtual environment 716 there is a virtual table 722 and a virtual bed 724. Within real-world space 716 there is a real-world bed 724. As depicted, real-world bed 724 can be designated as a static real-world object. Dynamic mapping can be performed as described with reference to FIG. 2-5, generating real-world walking path 726. A user can move through virtual environment 718 using redirected walking such that while the user walks along real-world walking path 726, the user visualizes virtual path 728. Dynamic mapping can be utilized such that both virtual table 722 and virtual bed 724 are mapped to real-world bed 720. Real-world walking path 726 can be a shorter path through real-world space 716 (e.g., when compared to real-world walking path 712 in FIG. 7A). A user can visualize in the virtual environment movement from virtual table 722b to virtual bed 724b along virtual path 728 even though in the real-world the user is walking from virtual table 722a, placed where real-world bed 720 is located in the real-world, to virtual bed 724a, placed where real-world bed 720 is located in the real-world, along real-world walking path 726.

FIG. 7C depicts utilizing a dynamic mapping between a virtual environment and a real-world space to generate a real-world path where the real-world space has a dynamic real-world object. Real-world space 732 indicates the area in which a user is able to physically move around in while exploring virtual environment 734. Within virtual environment 734 there is a virtual table 738 and a virtual bed 740. Within real-world space 732 there is a real-world bed 736. As depicted, real-world bed 736 can be designated as a dynamic real-world object. Dynamic mapping can be performed as described with reference to FIG. 2-5, generating real-world walking path 742. A user can move through virtual environment 734 using redirected walking such that while the user walks along real-world walking path 742, the user visualizes virtual path 744. Dynamic mapping can be utilized such that both virtual table 738 and virtual bed 740 are mapped to real-world bed 736. A user can visualize in the virtual environment movement from virtual table 738b to virtual bed 740b along virtual path 744 even though in the real-world the user is walking from virtual table 740a, placed where real-world bed 736 is located in the real-world, to virtual bed 738a, placed where real-world bed 736 is located in the real-world, along real-world walking path 742.

Figure 7D:
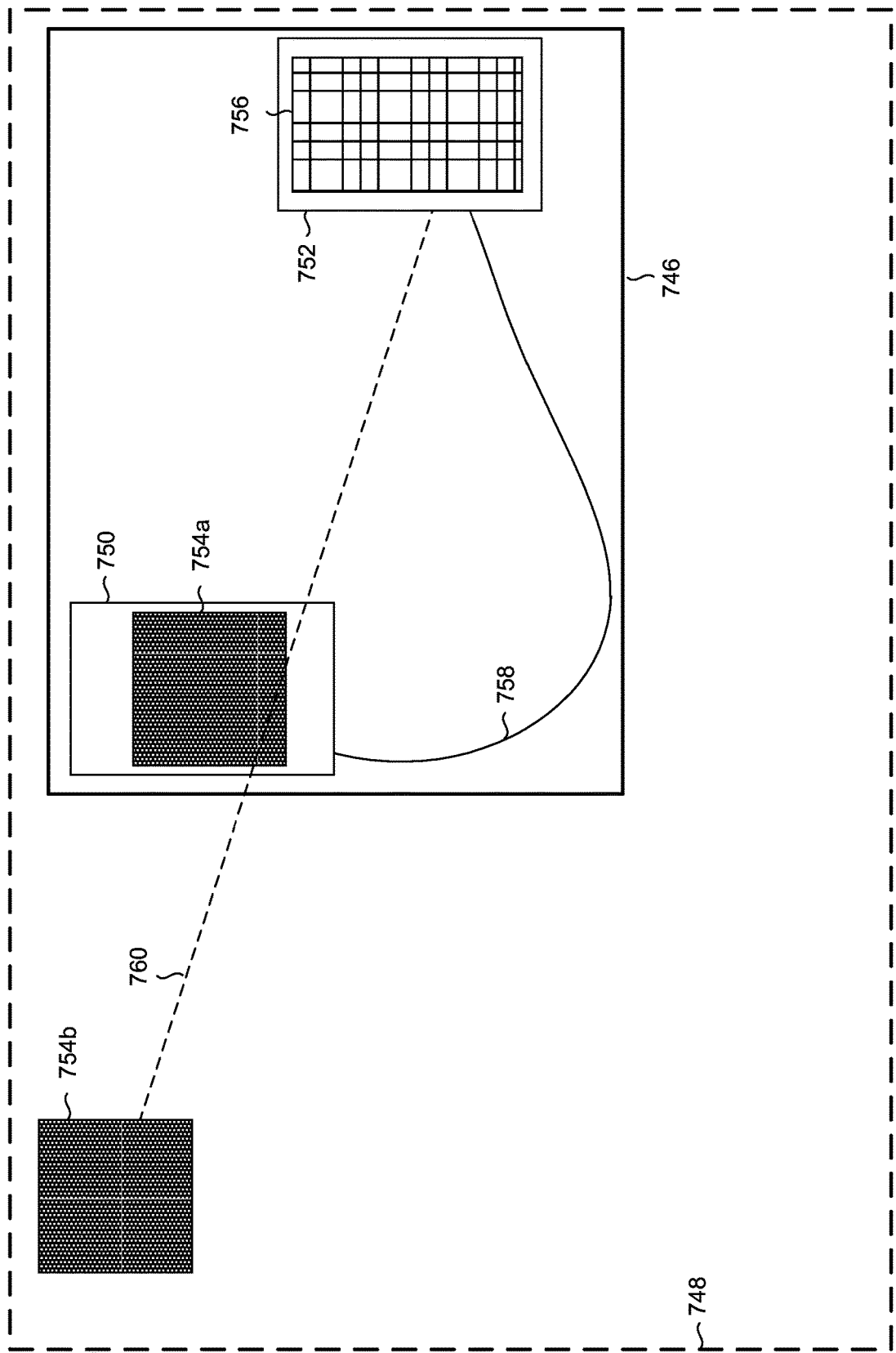
FIG. 7D illustrates an example dynamic mapping between a virtual environment and a real-world space with two dynamic real-world objects, in accordance with embodiments of the present disclosure.

FIG. 7D depicts utilizing a dynamic mapping between a virtual environment and a real-world space to generate a real-world path where the real-world space has two dynamic real-world objects. Real-world space 746 indicates the area in which a user is able to physically move around in while exploring virtual environment 748. Within virtual environment 748 there is a virtual table 754 and a virtual bed 756. Within real-world space 746 there is a real-world desk 750 and a real-world bed 752. As depicted, real-world desk 750 and real-world bed 752 can be designated as dynamic real-world objects. Dynamic mapping can be performed as described with reference to FIG. 2-5, generating real-world walking path 758. A user can move through virtual environment 748 using redirected walking such that while the user walks along real-world walking path 758, the user visualizes virtual path 760. Dynamic mapping can be utilized such that virtual table 754 is mapped to real-world table 750 and virtual bed 756 is mapped to real-world bed 752. Such mapping of the virtual table to the real-world table and the virtual bed to the real-world bed can be performed using, for example, matching based on height values. Upon determining the position of the real-world objects, the real-world objects can be matched with virtual objects using a list of pre-defined virtual objects and the positions of the virtual object. A user can visualize in the virtual environment movement from virtual table 754b to virtual bed 756 along virtual path 760 even though in the real-world the user is walking from virtual table 754a, placed where real-world table 750 is located in the real-world, to virtual bed 756, placed where real-world bed 752 is located in the real-world, along real-world walking path 758.

FIG. 8 depicts an illustrative dynamic mapping between a virtual environment and a real-world space, in accordance with embodiments of the present disclosure. User 802 is depicted as wearing head-mounted device 804. Head-mounted device 804 can be used to view virtual experiences using VR, AR or MR. Examples of such head-mounted devices include HoloLens and Meta Vision. It should be appreciated that other VR/AR/MR hardware devices can also be used besides head-mounted displays (e.g., a non-see-through hand-held display device, such as, for example a Tango mobile phone).

Real-world space 806 indicates the area in which a user is able to physically move around in while exploring virtual environment 808. Within the depicted virtual environment 808 there is a virtual dresser 816, virtual chair 818, virtual door 820, and virtual couch 822. Within the depicted real-world space 806 there is a real-world desk 812 and a real-world chair 814. Real-world desk 812 and real-world chair 814 can each be designated as either a static real-world object or dynamic real-world object. Dynamic mapping can be performed as described with reference to FIG. 2-5, mapping virtual scene 810 to real-world space 806. User 802 can move through virtual environment 808 using redirected walking where real-world objects are matched with virtual objects. For example, dynamic mapping can be utilized such that virtual dresser 816 is mapped to real-world desk 812 and virtual chair 818 is mapped to real-world chair 814. Such mapping of the virtual dresser to the real-world table and the virtual chair to the real-world chair can be performed using, for example, matching based on height values. Upon determining the position of the real-world objects, the real-world objects can be matched with virtual objects using a list of pre-defined virtual objects and the positions of the virtual object.

Figure 9:
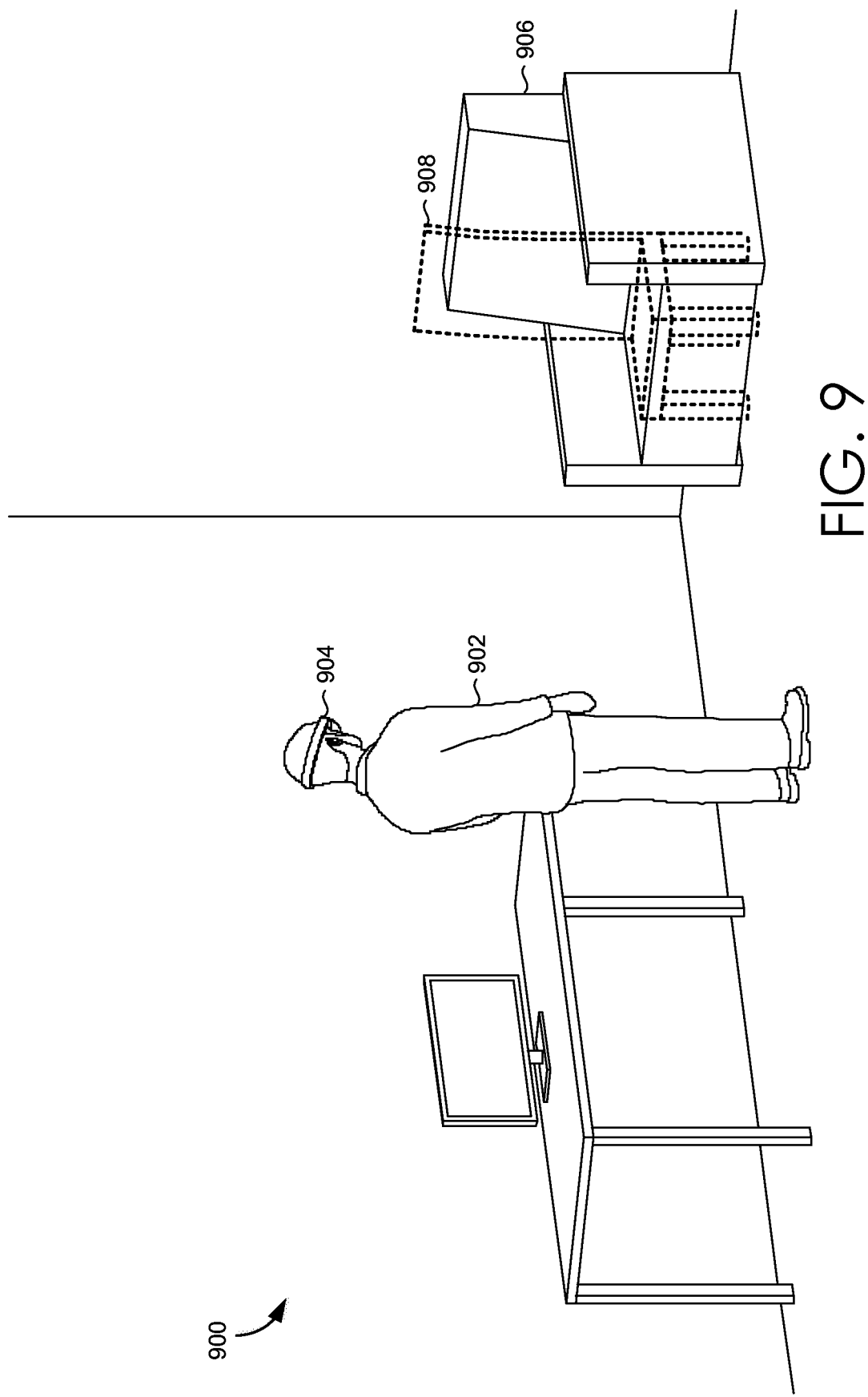
FIG. 9 depicts an illustrative dynamic mapping between a virtual environment and a real-world space, in accordance with embodiments of the present disclosure.

FIG. 9 depicts an illustrative dynamic mapping between a virtual environment and a real-world space, in accordance with embodiments of the present disclosure. User 902 is depicted as wearing head-mounted device 904. Head-mounted device 804 can be used to view virtual experiences using VR, AR or MR. Examples of such head-mounted devices include HoloLens and Meta Vision. It should be appreciated that other VR/AR/MR hardware devices can also be used besides a head-mounted display device (e.g., a non-see-through hand-held display device, such as, for example a Tango mobile phone).

User 802 can move through real-world space 800 using redirected walking visualized using device 804. Device 804 can also be used to visualize rendered virtual scenes. As depicted, real-world chair 906 has been aligned with virtual object chair 908. During the blending process of rendering, in AR environments, varying degrees of opacity can be used depending on how well real-world chair 906 and virtual object chair 908 align.

Figure 10:
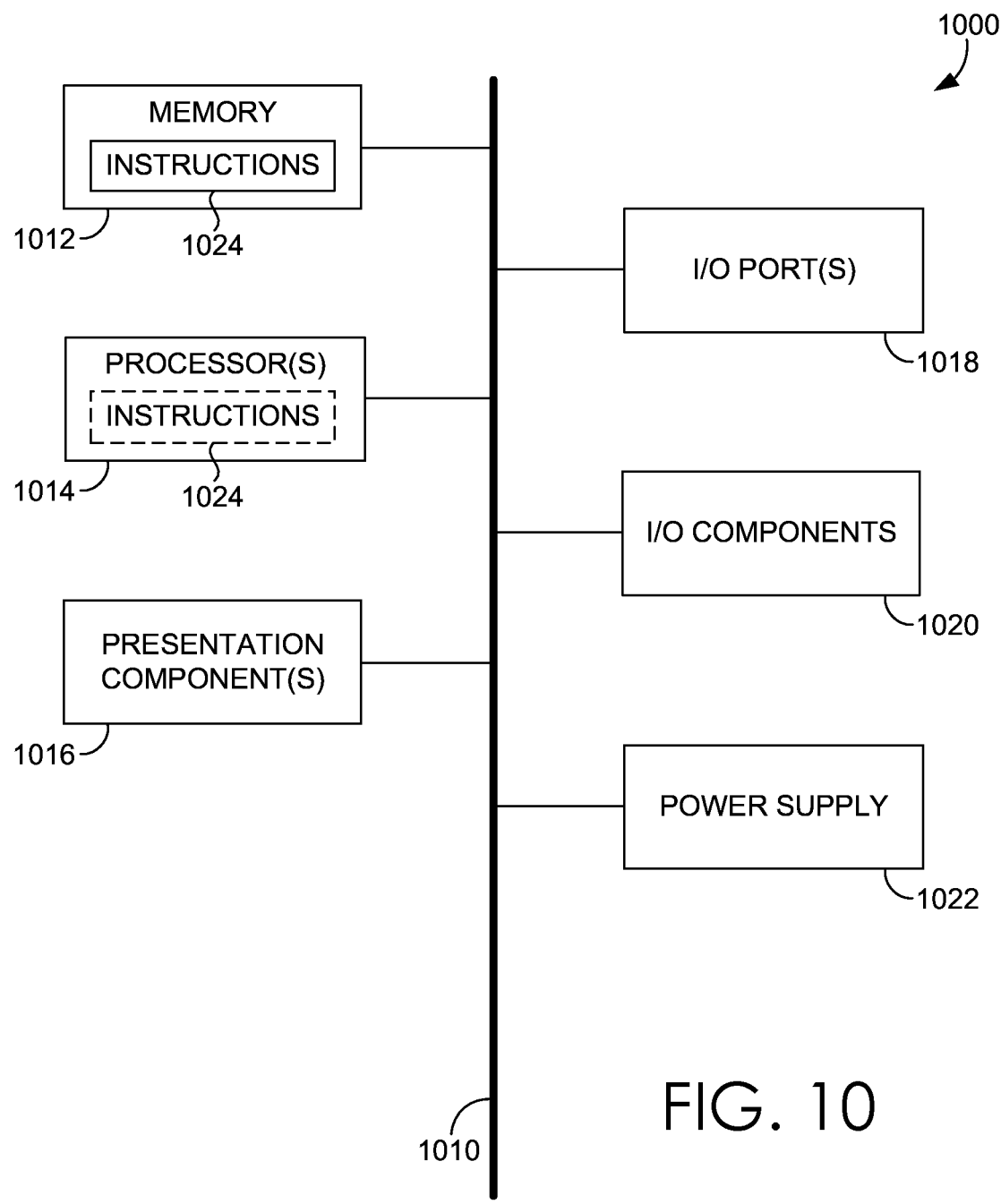
FIG. 10 is a block diagram of an example computing device in which embodiments of the present disclosure may be employed.

Having described embodiments of the present disclosure, FIG. 10 provides an example of a computing device in which embodiments of the present disclosure may be employed. Computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1000. Computing device 1000 may be equipped with depth cameras, such as stereoscopic camera systems, infrared camera systems, RGB camera systems, and combinations of these, for gesture detection and recognition. Additionally, computing device 1000 may be equipped with accelerometers or gyroscopes that enable detection of motion. The output of the accelerometers or gyroscopes may be provided to the display of computing device 1000 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media having a plurality of executable instructions embodied thereon, which, when executed by one or more processors, cause the one or more processors to perform operations comprising:

identifying a current viewing scene corresponding with a view in a virtual environment;

sampling a dense set of virtual pixels from the current viewing scene and a sparse set of virtual pixels from outside of the current viewing scene to generate a sample set of virtual pixels associated with the virtual environment, wherein the sample set of virtual pixels comprises the dense set of virtual pixels from the current viewing scene and the sparse set of virtual pixels from outside of the current viewing scene;

generating a dynamic map between the virtual environment and a real-world space by mapping the sample set of virtual pixels associated with the virtual environment to points in the real-world space;

rendering the current viewing scene in real-time based on the dynamic map, wherein virtual scene objects are matched with real-world objects;

wherein the rendering further utilizes a multi-pass process comprising:

determining that warping one or more rigid virtual objects will cause a visual disruption and that warping one or more deformable virtual objects will not cause the visual disruption;

removing the rigid virtual objects based on the determination;

applying a warping function to the deformable virtual objects; and replacing the rigid objects with the deformable virtual objects based on the matching of the real-world objects with the virtual scene objects; and providing a rendered virtual scene for display on a user device.

2. The media of claim 1, wherein the rendering includes blending based on alignment of the virtual scene objects and real-world objects, wherein the blending can increase transparency between the virtual scene and the real-world space.

3. The media of claim 1, wherein the matching of the real-world objects with the virtual scene objects further comprises:

comparing a height value of a real-world object with height values of the virtual scene objects; and matching the real-world object with one of the virtual scene objects based on the height value of the real-world object and a height value of the one of the virtual scene objects being within a predetermined threshold of each other.

4. The media of claim 1, the operations further comprising:

determining a change in the current viewing scene;

upon determining the change, performing a second mapping in real-time between the virtual environment and the real-world space; and rendering of an updated current viewing scene in real-time based on the second mapping.

5. The media of claim 1, the operations further comprising:
- determining a quality of the dynamic map based on an energy determination for shape preservation, static boundary avoidance, and dynamic obstacle avoidance; and
- utilizing the quality to optimize the dynamic map, wherein an optimized dynamic map has lower energy.

6. The media of claim 1, further comprising:
- utilizing the dynamic map to generate a real-world path correlating to a virtual path such that as a user follows the virtual path, the virtual scene objects are matched with the real-world objects.

7. A computer-implemented method, the method comprising:
- accessing virtual camera-aware sampling of a dense set of virtual points from visible content of a virtual scene in a virtual environment and a sparse set of virtual points from non-visible content of the virtual scene in the virtual environment, wherein the virtual camera-aware sampling comprises the dense set of virtual points from the visible content of the virtual scene and the sparse set of virtual points from the non-visible content of the virtual scene; mapping the virtual camera-aware sampling to points in a real-world space such that one or more virtual planar regions are mapped to real-world planar regions; and
- rendering the virtual scene based on the mapping, wherein real-world objects are matched with virtual scene objects;
- wherein the rendering utilizes a multi-pass process comprising:
  - determining that warping one or more rigid virtual objects will cause a visual disruption and that warping one or more deformable virtual objects will not cause the visual disruption;
  - removing the rigid virtual objects based on the determination;
  - applying a warping function to the deformable virtual objects; and
  - replacing the rigid objects with the deformable virtual objects based on matching of the real-world objects with the virtual scene objects.

8. The computer-implemented method of claim 7, further comprising:
- determining a change in the virtual scene;
- upon determining the change, performing a second mapping in real-time between the virtual scene and the real-world space; and
- rendering of the virtual scene in real-time based on the second mapping.

9. The computer-implemented method of claim 7, further comprising:
- providing a rendered virtual scene for display on a user device.

10. The computer-implemented method of claim 7, further comprising:
- determining a quality of the mapping based on an energy determination for shape preservation, static boundary avoidance, and dynamic obstacle avoidance; and
- utilizing the quality to optimize the dynamic map.

11. The computer-implemented method of claim 7, further comprising:
- utilizing the dynamic mapping to generate a real-world path correlating to a virtual path such that as a user follows the virtual path, the virtual scene objects are matched with the real-world objects.

12. The computer-implemented method of claim 7, wherein the matching of the real-world objects with the virtual scene objects further comprises:
- comparing a height value of a real-world object with height values of the virtual scene objects; and
- matching the real-world object with one of the virtual scene objects based on the height value of the real-world object and a height value of the one of the virtual scene objects being within a predetermined threshold of each other.

13. The computer-implemented method of claim 7, further comprising:
- blending based on the matching of the real-world objects with the virtual scene objects, wherein the blending changes the transparency of the virtual scene objects based on an alignment of the real-world objects with the virtual scene objects.

14. The computer-implemented method of claim 7, wherein the mapping occurs in real-time and the rendering occurs in real-time.

15. A computing system comprising:
- means for sampling a dense set of virtual points from visible content of a virtual scene and a sparse set of virtual points from non-visible content of the virtual scene as sampled virtual points associated with a virtual environment, wherein the sampled virtual points comprises the dense set of virtual points from visible content of the virtual scene and the sparse set of virtual points from the non-visible content of the virtual scene;
- means for dynamically mapping a virtual environment to a real-world space, wherein the mapping matches the sampled virtual points from the virtual environment to real-world points from the real-world space; and
- means for rendering the virtual scene based on the dynamic mapping, wherein the rendering is performed in real-time,
- wherein the rendering further utilizes a multi-pass process comprising:
  - determining that warping one or more rigid virtual objects will cause a visual disruption and that warping one or more deformable virtual objects will not cause the visual disruption;
  - removing the rigid virtual objects based on the determination;
  - applying a warping function to deformable virtual objects; and
  - replacing the rigid objects with the deformable virtual objects based on the matching of real-world objects with virtual scene objects.

16. The system of claim 15, further comprising:
- means for determining a quality of the mapping based on an energy determination for shape preservation, static boundary avoidance, and dynamic obstacle avoidance; and
- utilizing the quality to optimize the dynamic mapping.

* * * * *